US012000210B2

(12) United States Patent
Ballard et al.

(10) Patent No.: US 12,000,210 B2
(45) Date of Patent: Jun. 4, 2024

(54) EXTENSION LADDER, LADDER COMPONENTS AND RELATED METHODS

(71) Applicant: LITTLE GIANT LADDER SYSTEMS, LLC, Springville, UT (US)

(72) Inventors: Jay Ballard, Mapleton, UT (US); Christian Smith, Highland, UT (US); Gary Jonas, Springville, UT (US); Sean Peterson, Payson, UT (US); Brian Russell, Saratoga Springs, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 884 days.

(21) Appl. No.: 16/990,067

(22) Filed: Aug. 11, 2020

(65) Prior Publication Data

US 2020/0370371 A1 Nov. 26, 2020

Related U.S. Application Data

(63) Continuation of application No. 14/930,065, filed on Nov. 2, 2015, now Pat. No. 10,738,531.

(Continued)

(51) Int. Cl.

*E06C 1/12* (2006.01)
*E06C 7/06* (2006.01)
*E06C 7/46* (2006.01)

(52) U.S. Cl.

CPC .................. *E06C 1/12* (2013.01); *E06C 7/06* (2013.01); *E06C 7/46* (2013.01)

(58) Field of Classification Search

CPC ................. E06C 1/12; E06C 7/06; E06C 7/46
See application file for complete search history.

(56) References Cited

U.S. PATENT DOCUMENTS 480,655 A 8/1892 Bushnell
531,534 A 12/1894 Howard
(Continued)

FOREIGN PATENT DOCUMENTS

CN 201297119 Y 8/2009
CN 201934004 U 8/2011
(Continued)

OTHER PUBLICATIONS

International Preliminary Report on Patentability for International Application No. PCT/2015/058644 dated May 9, 2017; 6 pages.
(Continued)

*Primary Examiner* — Brian D Mattei
*Assistant Examiner* — Jacob G Sweeney
(74) *Attorney, Agent, or Firm* — Dorsey & Whitney LLP

(57) ABSTRACT

A ladder is provided having a base section and a fly section slidably coupled with the base section. The base section includes a first pair of spaced apart rails and a first plurality of rungs extending between and coupled to the first pair of spaced apart rails. The fly section includes a second pair of spaced apart rails and a second plurality of rungs extending between and coupled to the second pair of spaced apart rails. The various rungs may be coupled with their associated rails in an offset relationship such that they are not centered along a longitudinal center axis line of the rails. A rung lock device may be used which includes an arm pivotally coupled with the base section and configured to selectively engage various rungs of the second plurality of rungs to maintain the fly section in a desired position relative to the base section.

20 Claims, 38 Drawing Sheets

Related U.S. Application Data

(60) Provisional application No. 62/075,053, filed on Nov. 4, 2014.

(56) References Cited

U.S. PATENT DOCUMENTS

| | | | | | | |
|---|---|---|---|---|---|---|
| 838,275 | A | * | 12/1906 | Rich | E06C 7/46 | 182/46 |
| 1,352,323 | A | | 9/1920 | Johan | | |
| 2,040,977 | A | | 5/1936 | Carbis | | |
| 2,228,525 | A | | 1/1941 | Lundskow | | |
| 2,466,838 | A | | 4/1949 | Buell | | |
| 2,559,992 | A | | 7/1951 | Painter, Jr. | | |
| 2,588,959 | A | | 3/1952 | Campbell | | |
| 2,959,245 | A | | 11/1960 | Okeefe | | |
| 2,962,111 | A | | 11/1960 | Mckinnie | | |
| 3,119,425 | A | | 1/1964 | Buchner | | |
| 3,337,001 | A | | 8/1967 | Huska | | |
| 3,363,721 | A | | 1/1968 | Giuseppe | | |
| 3,565,211 | A | | 2/1971 | LeBlanc | | |
| 3,627,076 | A | * | 12/1971 | Robinson | E06C 1/12 | 182/82 |
| 3,902,569 | A | * | 9/1975 | Bair | E06C 1/12 | 182/211 |
| 4,039,047 | A | * | 8/1977 | Larson | E06C 7/46 | 182/111 |
| 4,371,055 | A | * | 2/1983 | Ashton | E06C 7/081 | 182/194 |
| 5,117,943 | A | | 6/1992 | Schmitt | | |
| 5,429,207 | A | | 7/1995 | Frank et al. | | |
| 5,758,745 | A | * | 6/1998 | Beggs | E06C 1/12 | 182/213 |
| 6,189,654 | B1 | | 2/2001 | Bailey | | |
| 10,738,531 | B2 | | 8/2020 | Ballard et al. | | |
| 2006/0060423 | A1 | * | 3/2006 | Astor | E06C 7/10 | 182/220 |
| 2011/0011679 | A1 | | 1/2011 | Leng | | |
| 2011/0127110 | A1 | | 6/2011 | Trang | | |
| 2015/0075907 | A1 | | 3/2015 | Moss et al. | | |

FOREIGN PATENT DOCUMENTS

| | | | | | |
|---|---|---|---|---|---|
| CN | 102341558 | A | | 2/2012 | |
| CN | 202187706 | U | | 4/2012 | |
| DE | 2753291 | A1 | | 6/1978 | |
| FR | 354025 | A | | 9/1905 | |
| FR | 2853688 | A1 | * | 10/2004 | E06C 7/44 |
| JP | S62103999 | U | | 7/1987 | |
| KR | 200146389 | Y1 | | 6/1999 | |
| WO | 2008052438 | A1 | | 5/2008 | |

OTHER PUBLICATIONS

Extended European Search Report for EP Application No. 15856386.6, dated May 25, 2018.

PCT International Search Report for corresponding PCT International Patent Application No. PCT/US2015/058644, dated Feb. 17, 2016.

* cited by examiner

EXTENSION LADDER, LADDER COMPONENTS AND RELATED METHODS

CROSS-REFERENCE TO RELATED APPLICATIONS

This application is a continuation of U.S. patent application Ser. No. 14/930,065, filed on 2 Nov. 2015, which application claims the benefit of U.S. Provisional Patent Application No. 62/075,053, filed 4 Nov. 2014, entitled EXTENSION LADDER, LADDER COMPONENTS AND RELATED METHODS, the disclosures of which are incorporated by reference herein in their entireties.

TECHNICAL FIELD

The present invention relates generally to ladders and, more particularly, to extension ladders, components for such ladders and related methods.

BACKGROUND

Ladders are conventionally utilized to provide a user thereof with improved access to elevated locations that might otherwise be inaccessible. Ladders come in many shapes and sizes, such as straight ladders, extension ladders, stepladders, and combination step and extension ladders (sometimes referred to as articulating ladders). So-called combination ladders may incorporate, in a single ladder, many of the benefits of multiple ladder designs.

Ladders known as straight ladders or extension ladders are ladders that, conventionally, are not self-supporting but, rather, are positioned against an elevated surface, such as a wall or the edge of a roof, to support the ladder at a desired angle. A user then ascends the ladder to obtain access to an elevated area, such as access to an upper area of the wall or access to a ceiling or roof. A pair of feet or pads, each being coupled to the bottom of an associated rail of the ladder, are conventionally used to engage the ground or some other supporting surface.

Extension ladders provide a great tool to access elevated areas while also being relatively compact for purposes or storage and transportation. However, extension ladders are often known as being very heavy, making them difficult to maneuver. The weight or bulk that is traditionally associated with extension ladders can be attributed, at least in part, to the need for rigidity in the ladder when it is fully extended. When the ladder is extended, it needs to be able to withstand bending and twisting tendencies when subjected to the weight of a user.

Additionally, rung lock mechanisms used on extension ladders to assist in the height adjustment of the ladder are sometimes perceived as being bulky and may get in the way of a user ascending or descending the ladder. For example, traditional rung lock mechanisms may effectively cause the useable portion of rung with which they are engaged to be more narrow, meaning that there is less area or space of the engaged rung for a user to stand on.

There is a continuing desire in the industry to provide improved functionality of ladders while also improving the safety and stability of such ladders.

SUMMARY

The present invention relates to ladders and various components of ladders. In accordance with one embodiment a ladder is provided that includes a base section comprising a first pair of spaced apart rails and a first plurality of rungs extending between and coupled to the first pair of spaced apart rails, a fly section comprising a second pair of spaced apart rails and a second plurality of rungs extending between and coupled to the second pair of spaced apart rails, the fly section being slidably coupled to the base section. The first plurality of rungs are offset towards a rear surface of the first pair of rails relative to a longitudinal centerline of the first pair of rails.

In one embodiment, the second plurality of rungs are offset towards a rear surface of the second pair of rails relative to a longitudinal centerline of the second pair of rails.

In one embodiment, the first plurality of rungs exhibit a substantially inverted cross-sectional triangular geometry.

In one embodiment, each the second plurality of rungs exhibit a larger upper surface area than do the first plurality of rungs.

In one embodiment, the first plurality of rungs exhibit a different cross-sectional geometry than the second plurality of rungs.

In one embodiment, the ladder includes at least one rung lock device coupled with a rail of the first pair of rails, the rung lock device having a pivotal arm configured to selectively and consecutively engage at least two different rungs of the second plurality of rungs to maintain the fly section in at least two different positions relative to the base section.

In one embodiment, the pivotal arm is substantially positioned below the engaged rung of the second plurality of rungs.

In one embodiment, at least one bearing component is coupled with an end of one of the first pair of rails and at least one other bearing component is coupled with an end of one of the second pair of rails.

In one embodiment, a rear surface of the second pair of rails is positioned along a line that is approximately half way between a front surface of the first pair of rails and a rear surface of the first pair of rails.

In one embodiment, the ladder includes a pair of feet, each foot being coupled with a lower end of a rail of the first pair of rails. In one particular embodiment, each foot includes at least one body portion, a traction surface, and an engagement member selectively positionable relative to the at least one body portion.

In one embodiment, the at least one body portion of the foot includes a first body portion and a second body portion, the first body portion being slidably coupled to the second portion along a curved surface.

In accordance with one embodiment, a ladder is provided that includes a base section comprising a first pair of spaced apart rails and a first plurality of rungs extending between and coupled to the first pair of spaced apart rails, a fly section comprising a second pair of spaced apart rails and a second plurality of rungs extending between and coupled to the second pair of spaced apart rails, the fly section being slidably coupled to the base section, and at least one rung lock device configured to selectively maintain the fly section in at least two different positions relative to the base section, wherein the at least one rung lock includes an arm pivotally coupled with a rail of the first pair of rails and being configured to selectively and selectively engage the lower surface of at least two different rungs of the second plurality of rungs.

In one embodiment, the at least rung lock device is configured so that a majority of the at least one rung lock device is positioned below an engaged rung when the ladder is in an orientation of intended use. In one particular embodiment, no part of the at least one rung lock device extends beyond an upper surface of the engaged rung.

In one embodiment, an upper portion of the arm includes a concave support surface.

In one embodiment, each of the second plurality of rungs includes an arcuate lower surface for substantially mating with the concave support surface.

In one embodiment, each of the second plurality of rungs exhibits a substantially inverted triangular cross-sectional geometry.

In one embodiment, each of the first plurality of rungs is positioned closer to a rear surface of the first pair of rails than to a front surface of the first pair of rails.

In one embodiment, a rear surface of the second pair of rails is positioned along a line that is approximately half way between the front surface of the first pair of rails and the rear surface of the first pair of rails.

In accordance with one embodiment, a ladder is provided comprising a base section comprising a first pair of spaced apart rails and a first plurality of rungs extending between and coupled to the first pair of spaced apart rails, each of the first pair of rails having a front surface and a rear surface, and a fly section comprising a second pair of spaced apart rails and a second plurality of rungs extending between and coupled to the second pair of spaced apart rails, each of the second pair of rails having a front surface and a rear surface; the fly section being slidably coupled to the base section, wherein an overall depth of the ladder, measured from the rear surface of the first pair of rails to the front surface of the second pair of rails, is approximately 1.65 times, or less, of a distance from the front surface of the first pair of rails to a rear surface of the front pair of rails.

In one embodiment, the overall depth of the ladder, measured from the rear surface of the first pair of rails to the front surface of the second pair of rails, is approximately 1.5 times, or less, of a distance from the front surface of the first pair of rails to a rear surface of the front pair of rails.

It is noted that the embodiments described herein are not to be considered mutually exclusive of one another and that any feature, aspect or component of one embodiment described herein may be combined with other features, aspects or components of other embodiments.

BRIEF DESCRIPTION OF THE DRAWINGS

The foregoing and other advantages of the invention will become apparent upon reading the following detailed description and upon reference to the drawings in which:

FIG. 7 is another perspective view of a portion of a rail of the ladder shown in

FIG. 1;

DETAILED DESCRIPTION

Figure 1:
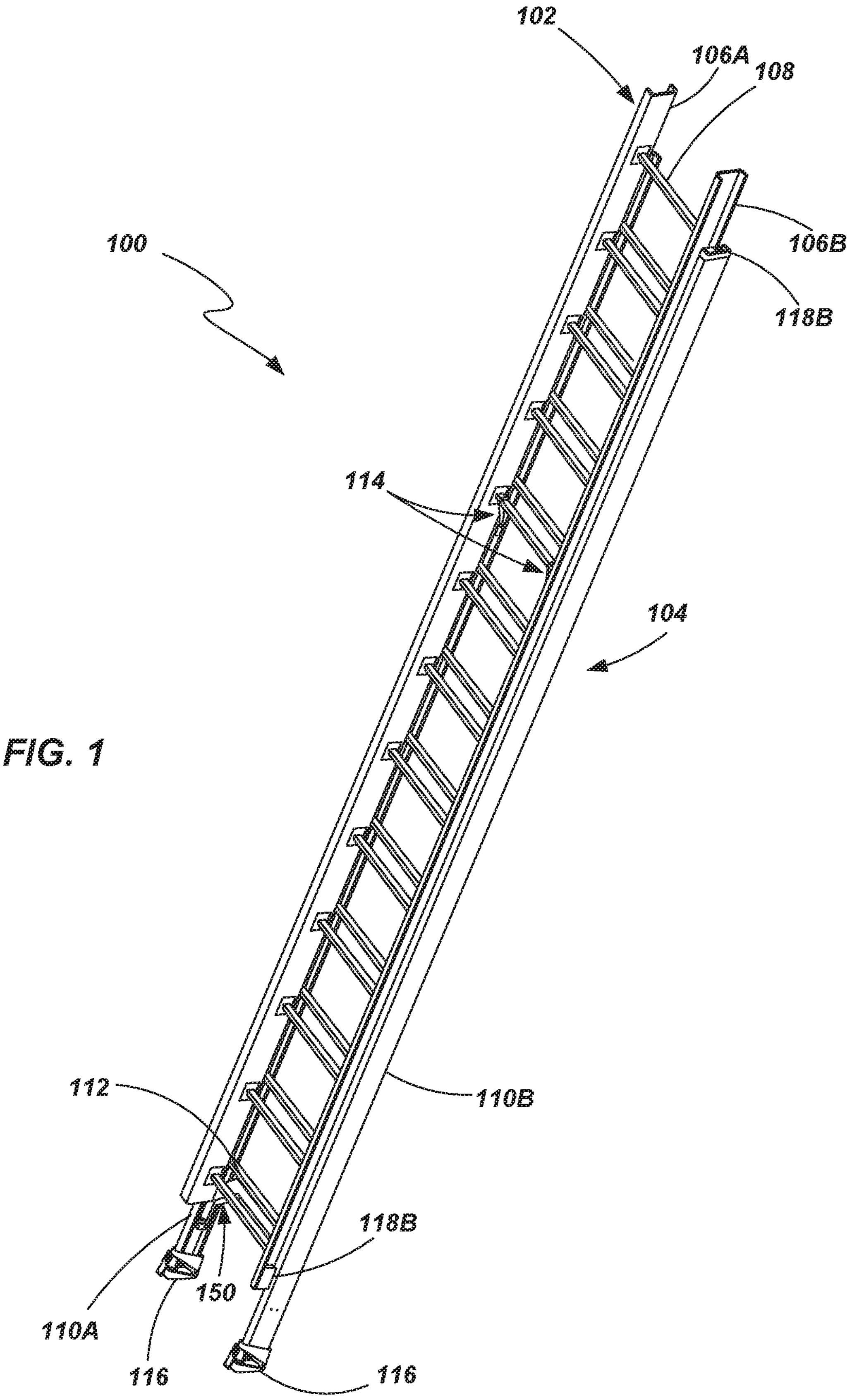
FIG. 1 is a perspective view of an extension ladder according to an embodiment of the present invention.

Referring to FIG. 1, a ladder 100 is shown according to an embodiment of the invention. The ladder 100 is configured as an extension ladder and includes a first assembly, which may be referred to as a fly section 102, and a second assembly, which may be referred to as a base section 104, the fly section 102 being slidably coupled with the base section 104. The fly section 102 includes a pair of spaced apart rails 106A and 106B (generally referenced as 106 herein for purposes of convenience) with a plurality of rungs 108 extending between, and coupled to, the rails 106. Similarly, the base section 104 includes a pair of spaced apart rails 110A and 110B (generally referenced herein as 110 for purposes of convenience) with a plurality of rungs 112 extending between, and coupled to, the rails 110.

Figure 3:
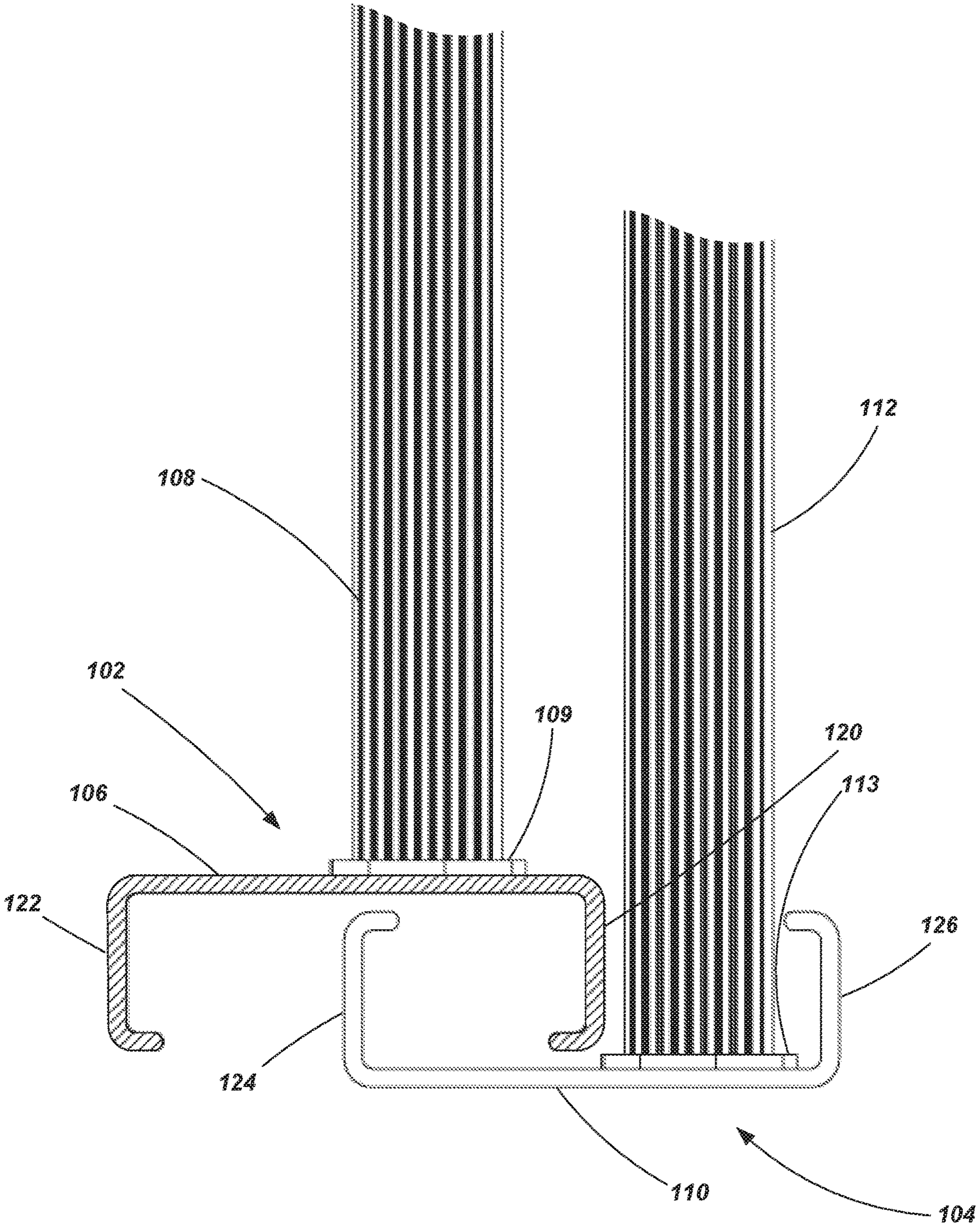
FIG. 3 is another partial cross-sectional view of a portion of the ladder shown in FIG. 1.

The rails 106 and 110 may be formed of a variety of materials. For example, the rails may be formed from composite materials, including fiberglass composites. In other embodiments, the rails 106 and 110 may be formed of a metal or metal alloy, including, for example, aluminum and aluminum alloys. The rails 106 and 110 may be formed using a variety of manufacturing techniques depending on various factors, including the materials from which they are formed. For example, when formed as a composite member, rails may be formed using pultrusion or other appropriate processes associated with composite manufacturing. In one embodiment, the rails 106 and 110 may be formed generally as C-channel members exhibiting a substantially "C-shaped" cross-sectional geometry (see, for example, FIG. 3).

The rungs 108 and 112 may also be formed from a variety of materials using a variety of manufacturing techniques. For example, in one embodiment, the rungs 108 and 112 may be formed from an aluminum material through an extrusion process. However, such an example is not to be viewed as being limiting and numerous other materials and methods may be utilized as will be appreciated by those of ordinary skill in the art. In one embodiment the rungs 108 and 112 may include a flange member 109 and 113 (also referred to as a rung plate), respectively, for coupling to associated rails 106 and 110 (see, e.g., FIG. 2). For example, the flanges 109 and 113 may be riveted or otherwise coupled with their associated rails 106 and 110.

In one particular embodiment, the rungs 108 and 112 may be assembled with the flange members 109 and 113 by inserting the rungs through an oversized through-hole formed in the flange member. The oversized through-hole provides ease of assembly and accommodates the tolerance of and extruded rung. The rung may be positioned so that the end of the rung is flush with the back side of the flange member, and a tapered punch may be used to expand the end of the rung until the rung is in intimate contact with the rung plate around the entire periphery of the rung plate hole. In one particular embodiment, the angle of the expanding punch may match an angle of the stamped through-hole in the flange member.

The rung and flange member may then be laser welded from the backside of the rung plate (the side that abuts against a ladder rail) without the use of filler wire. This process provides a joint that is not visible when the ladder is assembled as the weld area is on the back side of the rung plate that is in contact with the ladder rail when the rung plate is riveted to the rail. In other embodiments, other types of welding may be used, although laser welding provides certain advantages regarding tolerances and reduction of potential warping or heat deformation. In certain embodiments, an aluminum alloy may be used for the flange member that has approximately 4% magnesium aluminum alloy to prevent the rung from experiencing hot cracking when welded without filler wire. In one particular embodiment, a 5182 aluminum alloy may be used for the flange member and a 6000 series aluminum alloy may be used for the rung.

One or more mechanisms, often referred to as a rung lock 114, may be associated with the first and second assemblies 102 and 104 to enable selective positioning of the fly section 102 relative to the base section 104. This enables the ladder 100 to assume a variety of lengths (or, rather, heights when the ladder is in an intended operating orientation) by sliding the fly section 102 relative to the base section 104 and locking the two assemblies in a desired position relative to one another. By selectively adjusting the two rail assemblies (i.e., fly section 102 and base section 104) relative to each other, a ladder can be extended in length to nearly double its height as compared to its collapsed or shortest state as will be appreciated by those of ordinary skill in the art. The rung lock 114 is cooperatively configured with the fly section 102 and the base section 104 such that when the fly section 102 is adjusted relative to the base section 104, the associated rungs 106 and 110 maintain a consistent spacing (e.g., 12 inches between rungs that are immediately adjacent, above or below, a given rung). Further details of various embodiments of the rung lock 114 will be discussed hereinbelow.

A foot 116 may be coupled to the lower end of each rail 110 of the base section 104 to support the ladder 100 on the ground or other surface. The foot 116 may be configured so that it may be selectively adapted for use on an interior surface (e.g., the floor of a building), or on a surface such as the ground as will be discussed in further detail below.

The ladder 100 may additionally include a number of other components such as bearing members 118A and 118B, which may be positioned, for example, at or adjacent an end of a rail of either the fly section 102 or the base section (although they may be positioned at locations intermediate of rail ends as well), to help maintain the fly section 102 and base section 104 in their slidably coupled arrangement and also to maintain the unique spacing of the rails of each section 102 and 104 as further discussed below. Additionally, the ladder 100 may include various support structures including, for example, the bracket 150 positioned between (and coupled to) the rails 110A and 110B at a location beneath the lowest-most rung 112 of the base section 104 and which may include bumpers or “bump stops” as will be described in further detail below.

As shown in FIGS. 1-7 (it being noted that the views shown in FIGS. 2-7 show only exemplary portions of the rails 106 and 110 for illustrative purposes), the rails 110 of the base section 104 are offset relative to the rails 106 of the fly section 102. For example, the back surface 120 of the rails 106 of the fly section 102 may be at a position that is approximately half way between the front surface 124 and the rear surface 126 of the rails 110 associated with the base section 104. As best seen in FIGS. 2-5, the rungs 108 and 112 are also offset relative to their associate rails 106 and 110. For example, the rungs 108 of the fly section 102 are positioned closer the rear surface 120 than the front surface 122. Stated another way, the rungs 108 of the fly section 102 are offset, relative to a centered longitudinal axis 128 of the rails 106, in a direction towards the rear surface 120 of the rails 106. Similarly, the rungs 112 of the base section are offset towards the rear surface 126 of their associated rails 110, relative to a centered longitudinal axis 130. As such, the rungs 112 are positioned closer to the rear surface 126 than the front surface 124 of the rails 110. Such an arrangement enables the rails 106 of the fly section 102 and the rails 110 of the base section 104 to be positioned as described above and as shown in the drawings.

It is noted that, as shown in FIGS. 2-5, the rungs 112 of the base section 104 may be positioned closer to the rear surface 126 of the rails 110 than are the rungs 108 of the fly section 102 with respect to the rear wall 120 of their associated rails 106. In other words, the positioning of the rungs need not be identical in the fly section 102 as compared to the base section 104 (indeed, in some embodiments, the rungs 112 of the fly section 102 could be substantially centered along a longitudinal axis 128). It is also noted, however, that in the configuration shown, the positioning of the rungs 112 of the base section 104 relative to the rear surface 126 of the rails 110 has an impact on the offset nature of the rails 106 of the fly section 102 relative to the rails 110 of the base section 104. In other words, if the rungs 112 of the base section 104 are positioned closer to the rear surface 126 of their rails 110, the fly section 102 (and more specifically, its rails 106) may also be shifted further in the direction towards the rear surface 126 of the rails 110 of the base section 104. Offsetting the rails 106 of the fly section 102 laterally relative to the rails 110 of the base section 104 as described above (and shown in the drawings) provide a ladder 100 with an overall thinner side profile (i.e., the distance between the front surface 122 of the rails 106 of the fly section 102 to the rear surface 126 of the rails 110 of the base section 104). Stated another way, the configuration shown and described with respect to FIGS. 1-7 provides a reduced overall depth D (see FIG. 2) of the ladder 100. In one embodiment, the overall depth D of the ladder may be approximately 1.5 times the depth of the rails 106 of the fly section 102 or approximately 1.5 times the depth of the rails 110 of the base section 104. A thinner profile provides numerous advantages, including, for example, savings in storage space, shipping volume and ease of transportation. In another embodiment, the overall depth D of the ladder may be approximately 1.65 times the depth of 106 of the fly section 102 or approximately 1.5 times the depth of the rails 110 of the base section 104.

It is further noted that, in the embodiment shown in FIGS. 2-5, the rungs 108 of the fly section 102 have little functional impact on the operation of the ladder 100 (other than interaction with the rung lock 114 which shall be described below). In other words, the rungs 108 may be centered along the axis 126, or even offset towards the front surface 122 of the rails 106 and the fly section 102 would still be displaceable relative to the base section 104 and still enable a user to ascend the ladder 100 using predictable and consistent spacing between the rungs.

The rungs 108 and 112 may exhibit various geometries. For example, referring to FIG. 2, the rungs 108 and 112 may exhibit a generally inverted triangular cross-sectional geometry having a substantially flat upper surface for the tread with angular surfaces extending downward from the tread. The transition between the two angular surfaces may be substantially rounded or arcuate as shown. More specifically, with reference to FIG. 2, the cross-sectional geometry includes a generally flat upper surface 190 which may include, for example, ridges, grooves, or other traction features. In some embodiments, the upper surface 190 may not be truly flat, but may exhibit a slight arcuate convex shape along its outer surface. A front wall or surface 192 extends downwardly from the upper surface 190 at an acute angle. A rear wall or surface 194 also extends downwardly from the upper surface 190 at an acute angle such that the front surface 192 and the rear surface 194 converge towards one another as they extend downwards. A lower wall or surface 196 of the rung is substantially arcuate and extends from the front surface 192 to the rear surface 194 creating a closed periphery and defining an opening extending through rung 108 and 112.

Figure 2:
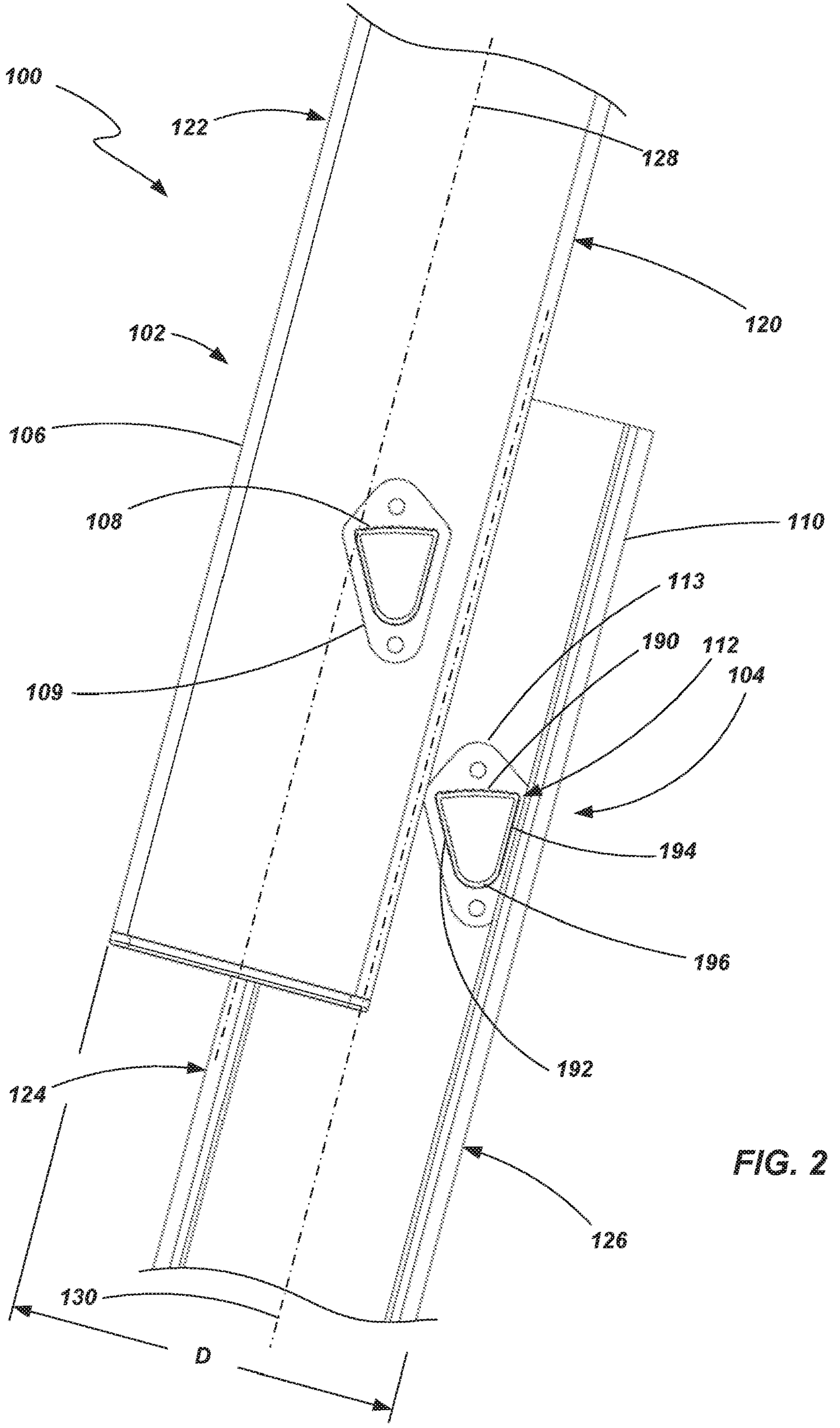
FIG. 2 is a partial cross-sectional side view of a portion of the ladder shown in FIG. 1.

Such a rung geometry may reduce the depth of the tread (the distance across the top surface when looking at the cross-section, such as seen in FIG. 2), making it possible to shift the rails 106 of the fly section 102 even further towards the back surface 126 of the rails 110 of the base section 104. In other words, the use of rungs 108 and 112 having a geometry such as shown and described herein provides a rung that may be more easily shifted from the center lines 128 and 130 of their associated rails (see FIG. 2) in order to accommodate the more compact arrangement of the fly section 102 and base section 104 as previously described. The geometry of the rungs may also provide certain advantages with regard to the ability of the rung to withstand deflection while also possibly reducing the amount of material required to form the rung, again reducing the weight of the overall ladder. Further, the shape of the rungs may more easily accommodate the use of the various rung locks described in further detail below.

Of course, other geometries are also contemplated for the rungs 108 and 112. For example, the rungs may be configured substantially as I-beams, as channel members or they may be configured more conventionally as round rungs, or D-rungs. Additionally, the rungs 108 of the fly section 102 need not exhibit the same geometry as the rungs 112 of the base section 104. For example, referring briefly to FIGS. 12A-12G, another geometry is shown for the rungs, wherein the rungs 112 of the base section 104 are configured as described above, while the rungs 108 of the fly section 102 exhibit a slightly different geometry. With specific reference to FIG. 12A, the rungs 108 of the fly section 102 include an upper tread surface 191 that is substantially planar (or slightly convex) and may have a plurality of ridges and/or grooves or other traction features. A first portion 193 of the front wall extends downwardly from the upper wall 191 at an acute angle (relative to the upper wall), and a second portion 195 of the front wall extends downwardly from the first portion 193 of the front wall at an obtuse angle relative thereto. A rear wall 197 extends downwardly from the upper wall 191 forming an acute angle therewith. A lower wall or surface 199 of the rung is substantially arcuate and extends from the second portion 195 of the front surface or wall to the rear surface or wall 197 creating a closed periphery and defining an opening extending through the rung. It is also noted that the depth of the tread surface of the rung 108 on the fly section 102 is greater than the depth of the tread surface of the rung 112 on the base section 104 in this particular embodiment. The greater depth of the tread surface may give a user added comfort and stability when standing on the upper portions of the ladder 100. Additionally the added depth may provide increased rigidity to the fly section 102 of the ladder 100.

Figure 4:
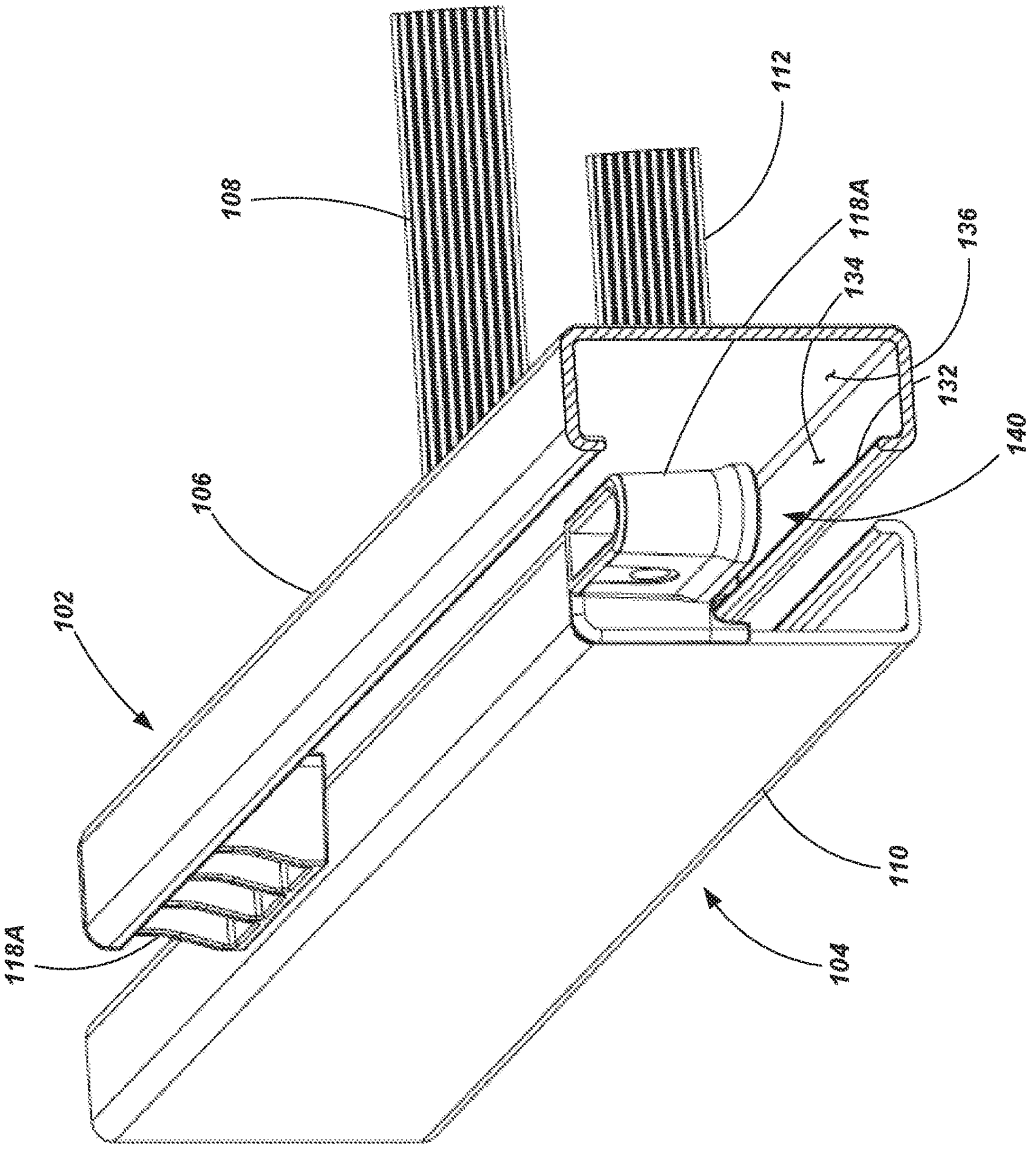
FIG. 4 is perspective view of an end portion of ladder shown in FIG. 1.
Figure 5:
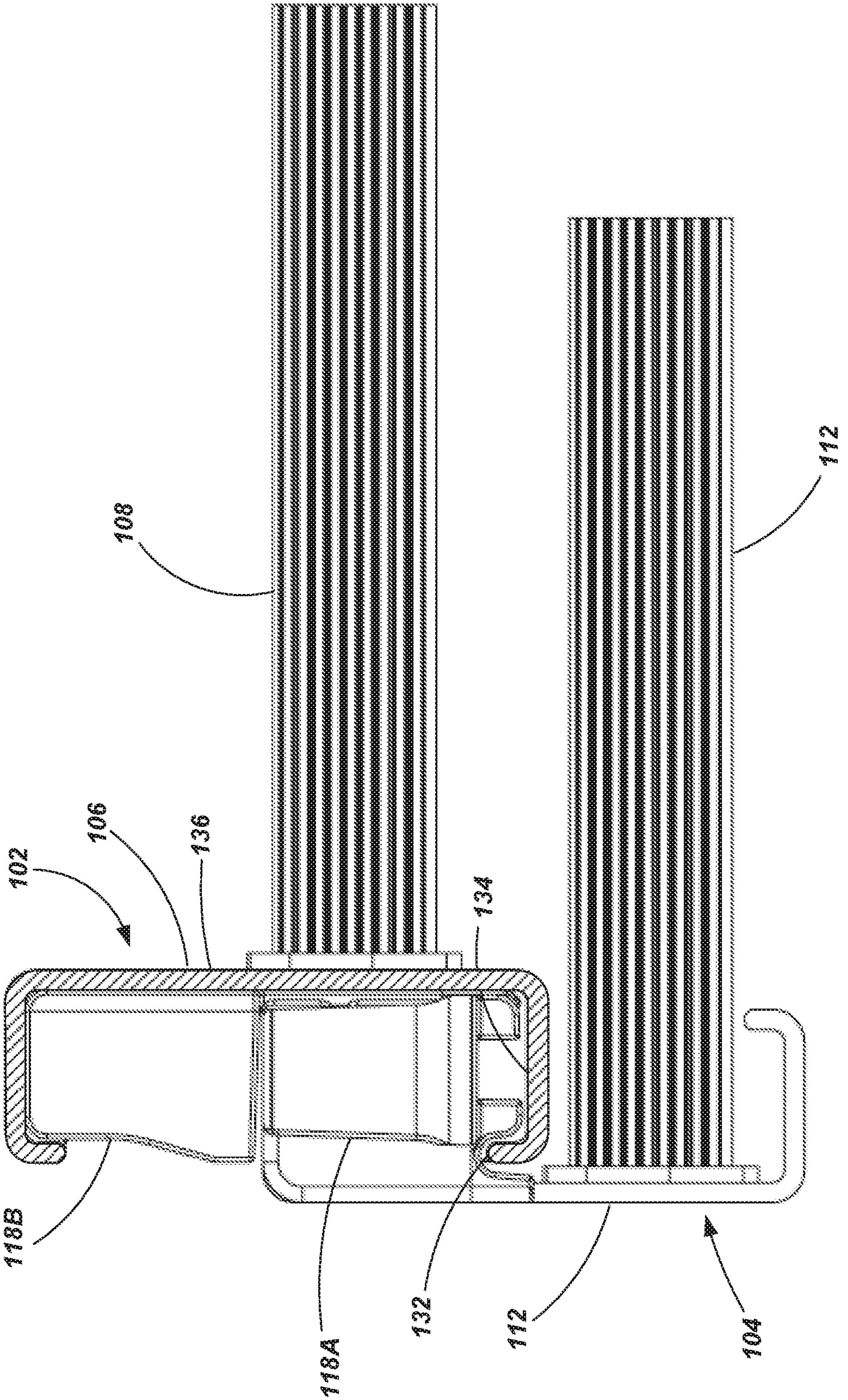
FIG. 5 is an end view of a portion of the ladder and apparatus shown in FIG. 1.

Referring now to FIGS. 4 and 5, bearing members 118A and 118B may be coupled to a given rail and configured to maintain lateral spacing between, and enable sliding displacement of, the fly section 102 relative to the base section 104 (lateral spacing in this context being in a direction that is substantially perpendicular to the axes 128 and 130). For example, a first bearing member 118A may be coupled to an end of a rail 110 of the base section 104 and may be at least partially disposed within the channel defined by the rail 110 of the base section 104. The first bearing member 118A may also engage a lip member 132 of the rail 106 of the fly section 102. Additionally, portions of the first bearing member 118A may engage additional surfaces of the rail 106 of the fly section 102. For example, portions of the first bearing member 118A may engage an internal flange surface 134 and/or an internal web surface 136 of the rail 106 of the fly section 102. During relative movement of the fly section 102 and the base section 104, the first bearing member 118A remains coupled to the upper end of the rail 110 of the base section 104 while slidingly engaging the rail 106 of the fly section 102 (i.e., while the rail 106 slides relative to the bearing member 118A in a direction substantially parallel to the axes 128 and 130). The first bearing member 118A may also include other components integrated therewith. For example, a pulley member 140 may be integrated into the first bearing member 118A as will be discussed in further detail below.

A second bearing member 118B may be positioned, for example, near the lower end of the rail 106 of the fly section 102. The second bearing member 118B may be at least partially disposed within the channel of the rail 106 of the fly section 102 and have a surface that engages the front surface 124 of the rail 110 of the base section 104. During relative movement of the fly section 102 and the base section 104, the second bearing member 118B remains coupled to the rail 106 of the fly section 102 while slidingly engaging rail 110 of the base section 104 (i.e., the bearing member 118B travels with the rail 106 of the fly section 102 relative to the rail 110 of the base section 104). While not specifically shown, other bearing members may be coupled to either rail member (106 or 110) while slidingly engaging the other rail member and, further, may be positioned at locations other than at or adjacent the upper or lower ends of the rails. It is also noted that the bearing members are specifically shown with respect to two matching or mating rails (i.e., 106 and 110) and that it will be understood that bearing members are contemplated as being associated with both matching pairs of rails.

The use of bearing members, such as described above, enable a desired spacing of the rails 106 of the fly 102 section relative to the rails 110 of the base section 104 (e.g., the "offset" spacing as described above). Additionally, the use of bearing members enable the fly section 102 to be slidably coupled with the base section without the need to use a conventional J-bracket as will be recognized by those of ordinary skill in the art. Further, use of bearing members such as described herein helps to provide a desired level of structural rigidity between the fly section 102 and the base section 104.

Figure 6:
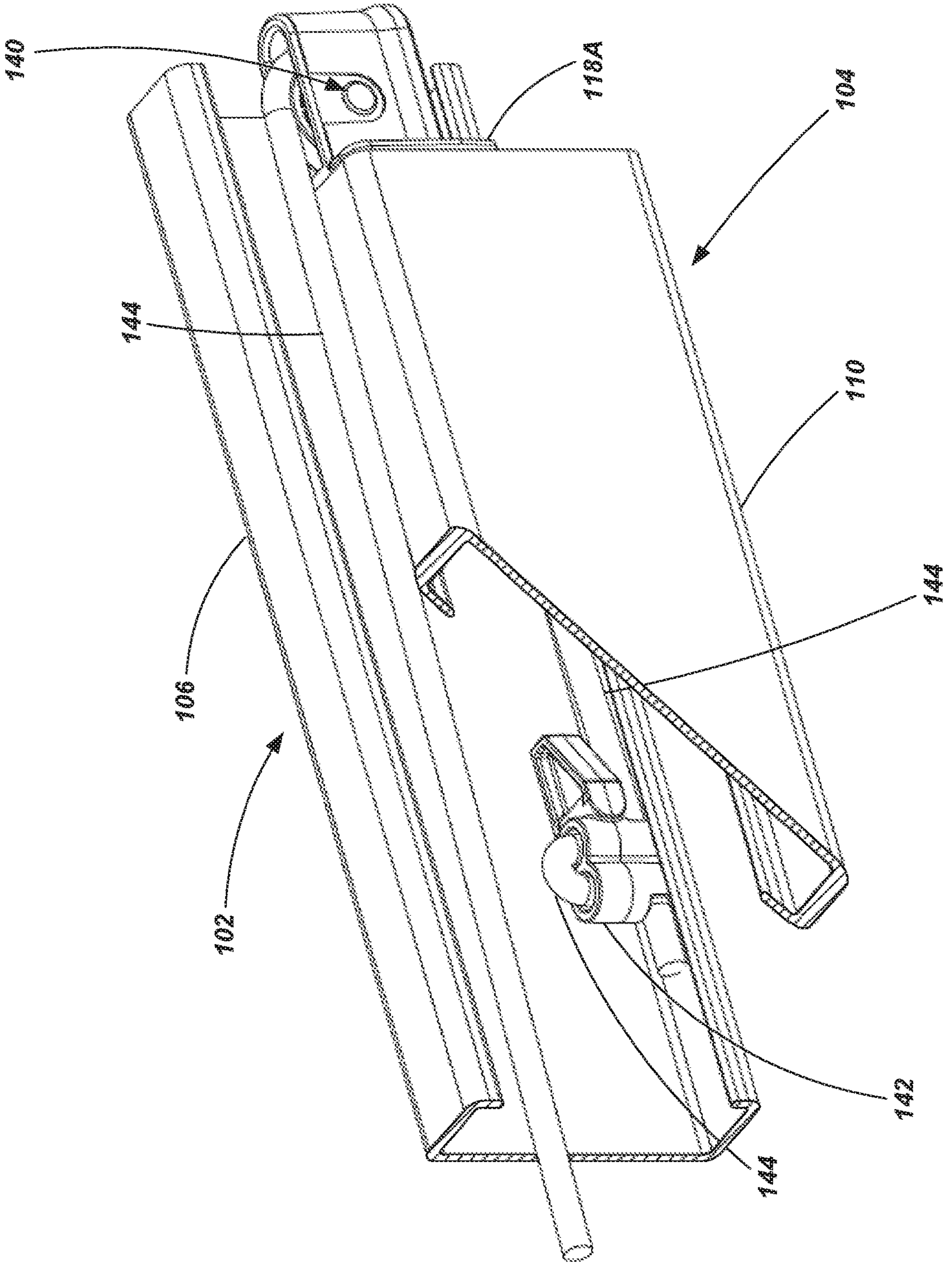
FIG. 6 is another perspective view of a portion of the ladder shown in FIG. 1, with a portion of a rail cut away for illustrative purposes.
Figure 7:
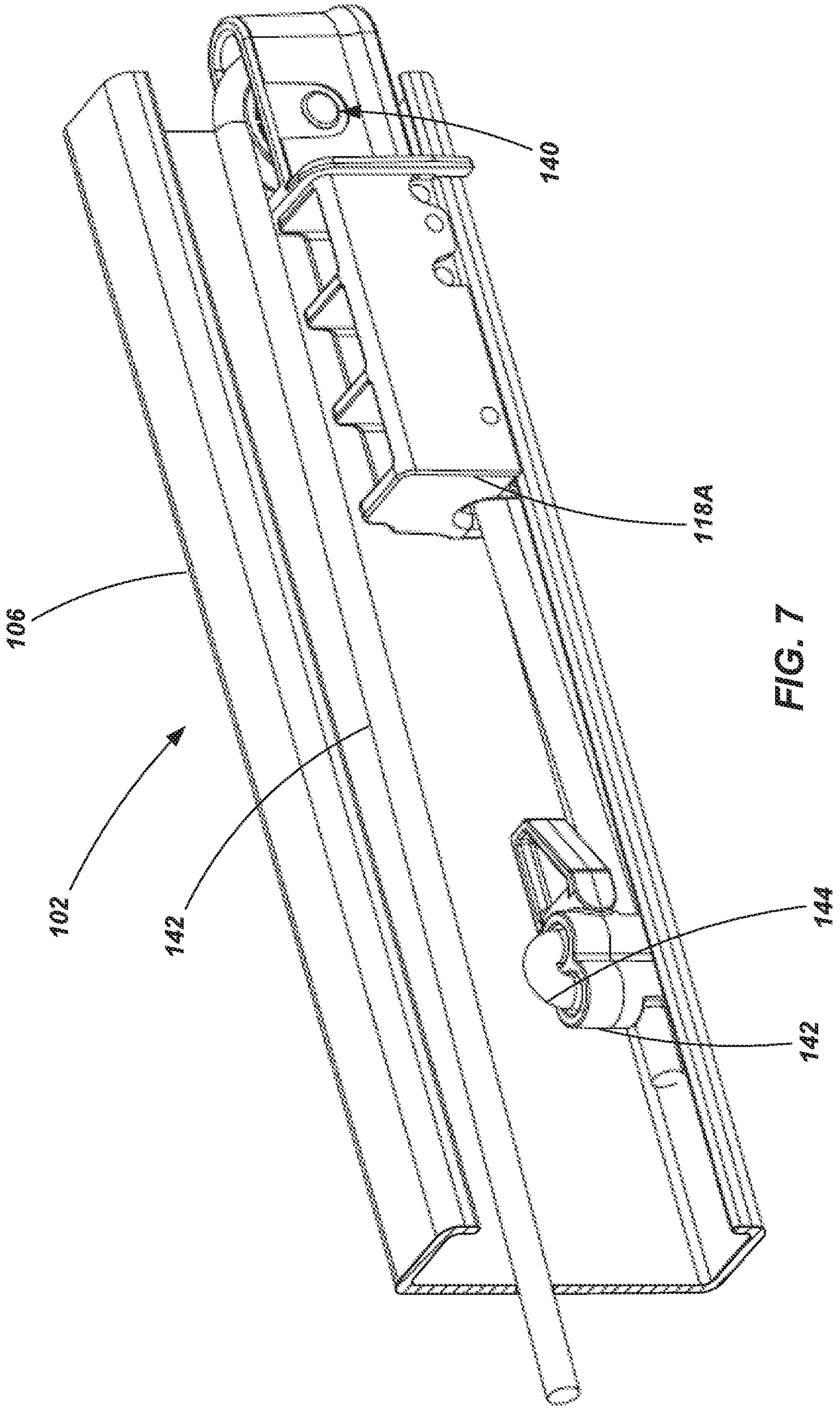

Referring briefly to FIGS. 6 and 7, the first bearing member 118A is shown with an integrated pulley 140. Additionally, a clamping member 142 is shown which is configured to clamp a portion of a rope 144 to an associated rail 106. As will be appreciated by those of ordinary skill in the art, a rope and pulley system is often deployed in an extension ladder to assist in raising and lowering the fly section 102 relative to the base section 104. Conventionally, the rope and pulley system includes a rope that extends down the front of the rungs 108 and 112 approximately midway between the side rails 106 and 110 of the ladder 100. In the embodiment shown in FIGS. 6 and 7, a rope 144 is positioned along the side of the ladder 100 such that a portion of it is disposed within the channel defined by a rail 106 of the fly section 102. The rope 144 passes through the pulley 140, extends longitudinally through the first bearing member 118A and is coupled with a clamping device 142. Thus, when a user pulls downwardly on the rope 144 (e.g., the "non-clamped" section of rope extending downward from pulley 140) it causes the fly section 102 to become displaced upward relative to base section 104. Another example of a positioning system that may be utilized in conjunction with the rope 144 and pulley 140 of the present invention is described in U.S. patent Ser. No. 14/490,496, filed Sep. 18, 2014, entitled LADDERS INCLUDING ROPE AND PULLEY SYSTEM AND FALL PROTECTION DEVICE (U.S. Patent Publication No. 2015/0075907), the disclosure of which is incorporated by reference herein in its entirety.

Referring now to FIGS. 8-10K (which, it is noted, include views showing only exemplary portions of the rails 106 and 110 for illustrative purposes), a rung lock device 114 is shown in accordance with an embodiment of the present invention. As will be appreciated by those of ordinary skill in the art, rung lock devices are used to enable the fly section 102 to be adjusted to a variety of different positions relative to a base section 104 of the ladder, and to maintain the fly section 102 in a desired position after such adjustment. It is noted that a single rung lock device 114 is shown in FIGS. 8-10E, but that a pair of rung lock devices may be used, each being configured to concurrently engage a common rung of the fly section 102 (as indicated in FIG. 1), and that the second rung lock device is essentially the same as that which is described below, although mirrored given its placement or coupling with the opposing rail of the base section. Thus, for purposes of convenience, only a single rung lock is described below, although the following description is equally applicable to the second rung lock device.

The rung lock 114 includes a bracket 162 that is coupled with a rail 110 of the base section 104. The bracket 162 may include, or be coupled with, a guide member 164 configured to engage, for example a rear surface 120 and/or a web surface of a rail 106 of the fly section 102. The guide member 164 may act as another bearing point between the fly section 102 and the base section 104 as they are adjusted relative to each other. The rung lock 114 further includes an arm 166 that is pivotally coupled with the bracket 162. A rung support member 168 is located at an upper end of the arm 166 (considering the ladder as being oriented for its intended use) and may include a cup or support surface 170 sized and shaped for engaging the lower surface of the rungs 108 associated with the fly section 102. In the embodiment shown in FIGS. 8-10E, the cup or support surface 170 may be formed as a substantially arcuate, concave surface.

A biasing member 172, such as a coil spring or other resilient body, may be positioned between the arm 166 and, for example, a portion of the bracket 162 to bias the arm 166 out towards the front surface 122 of the rails 106 of the fly section 102. The arm 166 is, thus, biased outward to abut a limiter 174 (e.g., a protrusion associated with the guide member 164) to a position that places the cup or support surface 170 beneath a rung 108 of the fly section 102.

The rung lock 114 may further include a latch member 180 (which may also be referred to as a flipper, or a pivoting guide member) that is configured to extend above a portion of a rung 108 when the fly section 102 is adjusted at a desired height, relative to the base section 104, and the cup or support surface 170 is engaged with a lower surface of the same rung 108. The latch member 180 is pivotally coupled with a portion of the arm—such as the rung support portion 168—and may be biased to a desired position (e.g., the position shown in FIGS. 8 and 9) by springs or other elements as will become more apparent upon reading the description below. In some embodiments, the latch member 180 may be configured to be locked in place when positioned above a rung 108 and with the rung 108 positioned in the cup/support surface 170 so that a user has to affirmatively release the lock in order to adjust the ladder. In other embodiments, the latch member 180 may be configured to be displaced by the rung 108 simply by lifting the fly section 102 relative to the base section 104. In either case, the latch 180 enables the rung lock 114 to adjust during displacement of the fly section 102 relative to the base section 104 such that it may engage different rungs 108 of the fly section 102 as will be described in further detail below.

Figure 8:
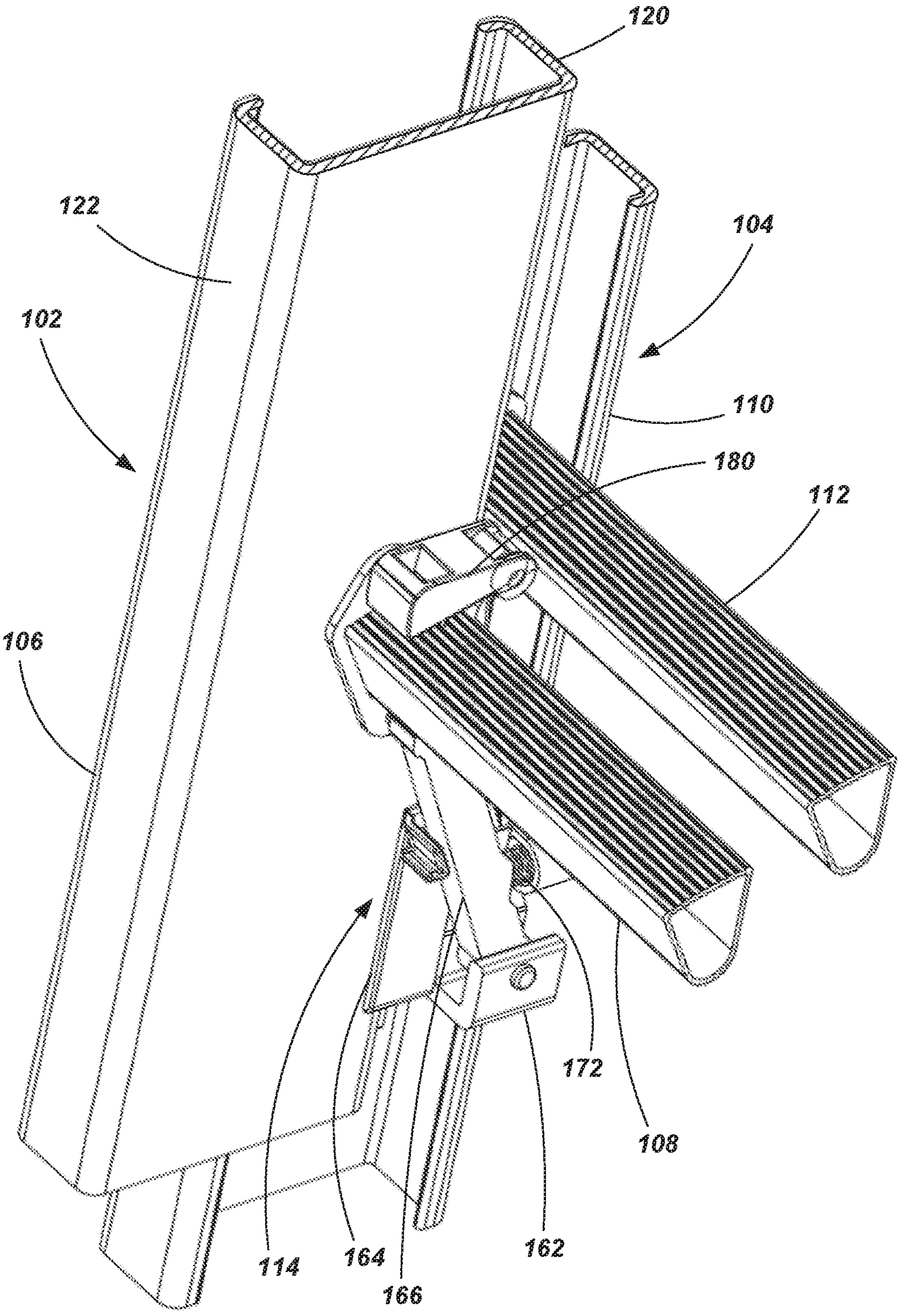
FIG. 8 is another perspective view of a portion of the ladder shown in FIG. 1.
Figure 9:
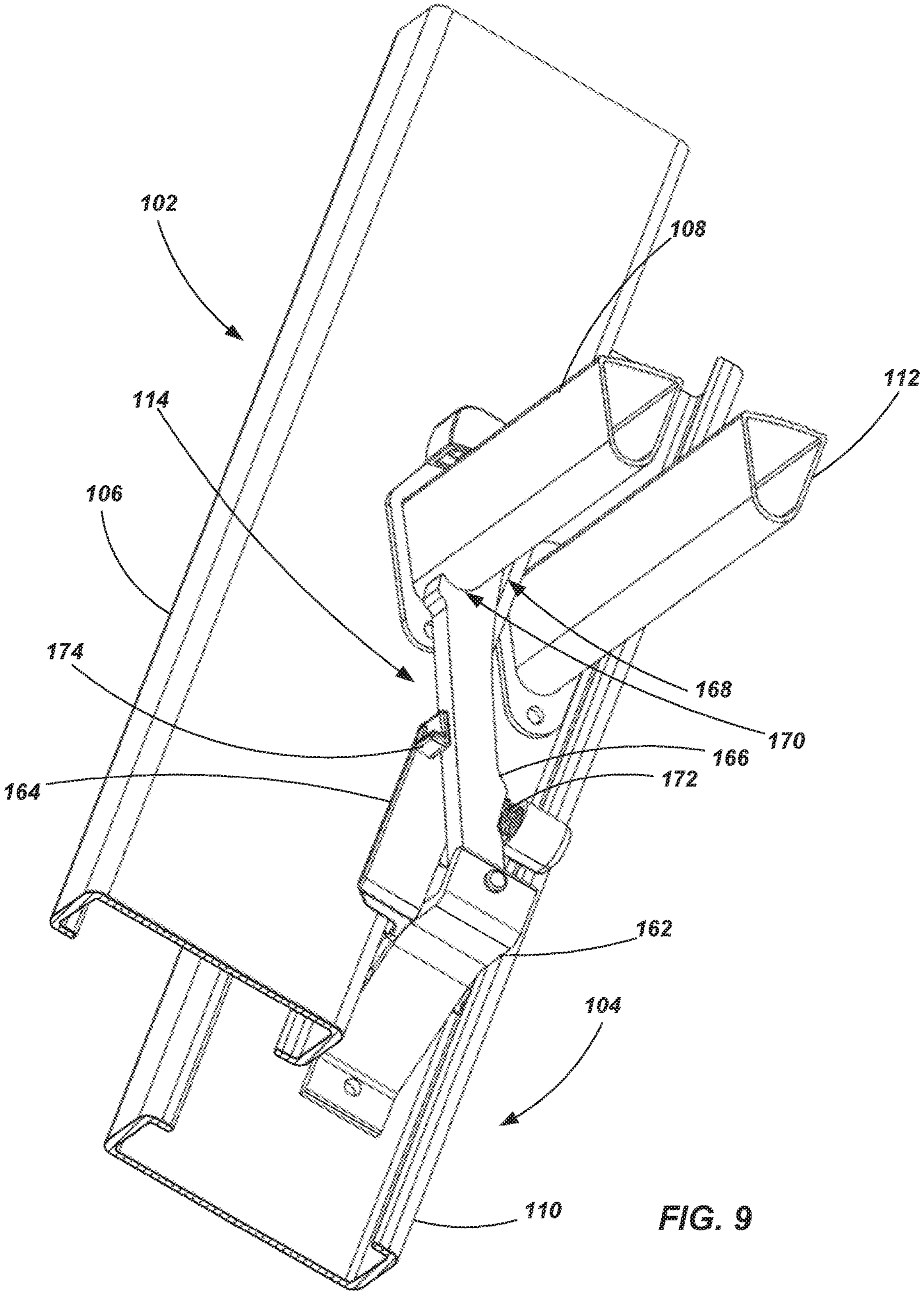
FIG. 9 is another perspective view of the portion of the ladder shown in FIG. 8.
Figure 10A:
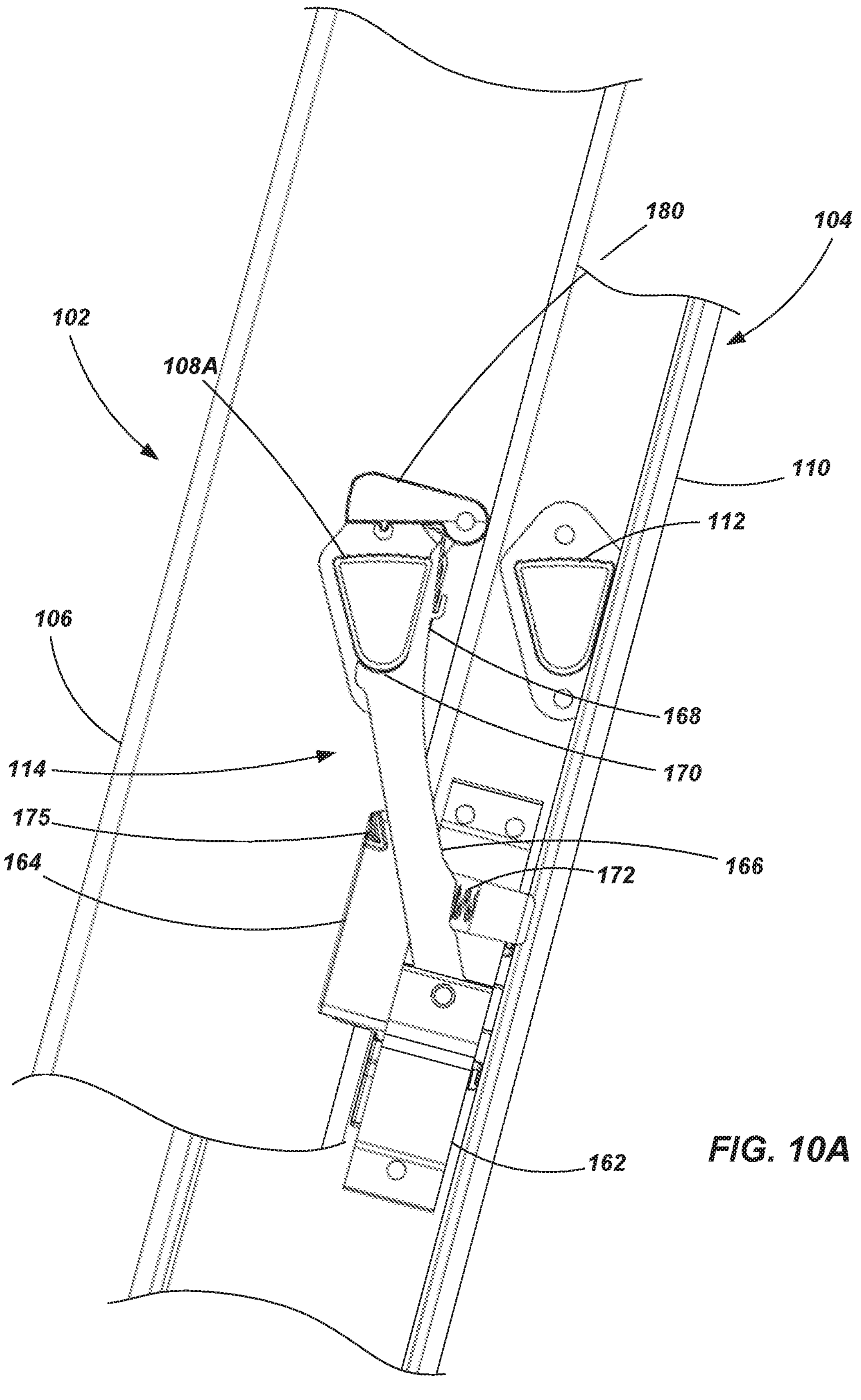
FIGS. 10A-10K show a portion of a ladder, including a rung lock in various states or conditions of use according to an embodiment of the invention.

As seen in FIGS. 8, 9 and 10A, when the fly section 102 is adjusted to a desired height, the bottom surface of a rung 108 rests within the cup or support surface 170 of the rung lock 114. The arm 166, coupled with the base section 104 via the bracket 162, maintains the position of the fly section 102 relative to the base section 104. In contrast with conventional rung locks, the rung lock 114 of the present invention is located primarily below the rung 108 of the fly section 102 and is coupled with the base section 104. Conventional rung locks include a component that is pivotally coupled with a rail of the fly section, the pivot location being above the rung (on the fly section) with which it is associated, and typically rests upon an upper surface of a rung of the base section preventing the fly section from sliding back downwards relative to the base section.

Figure 10B:
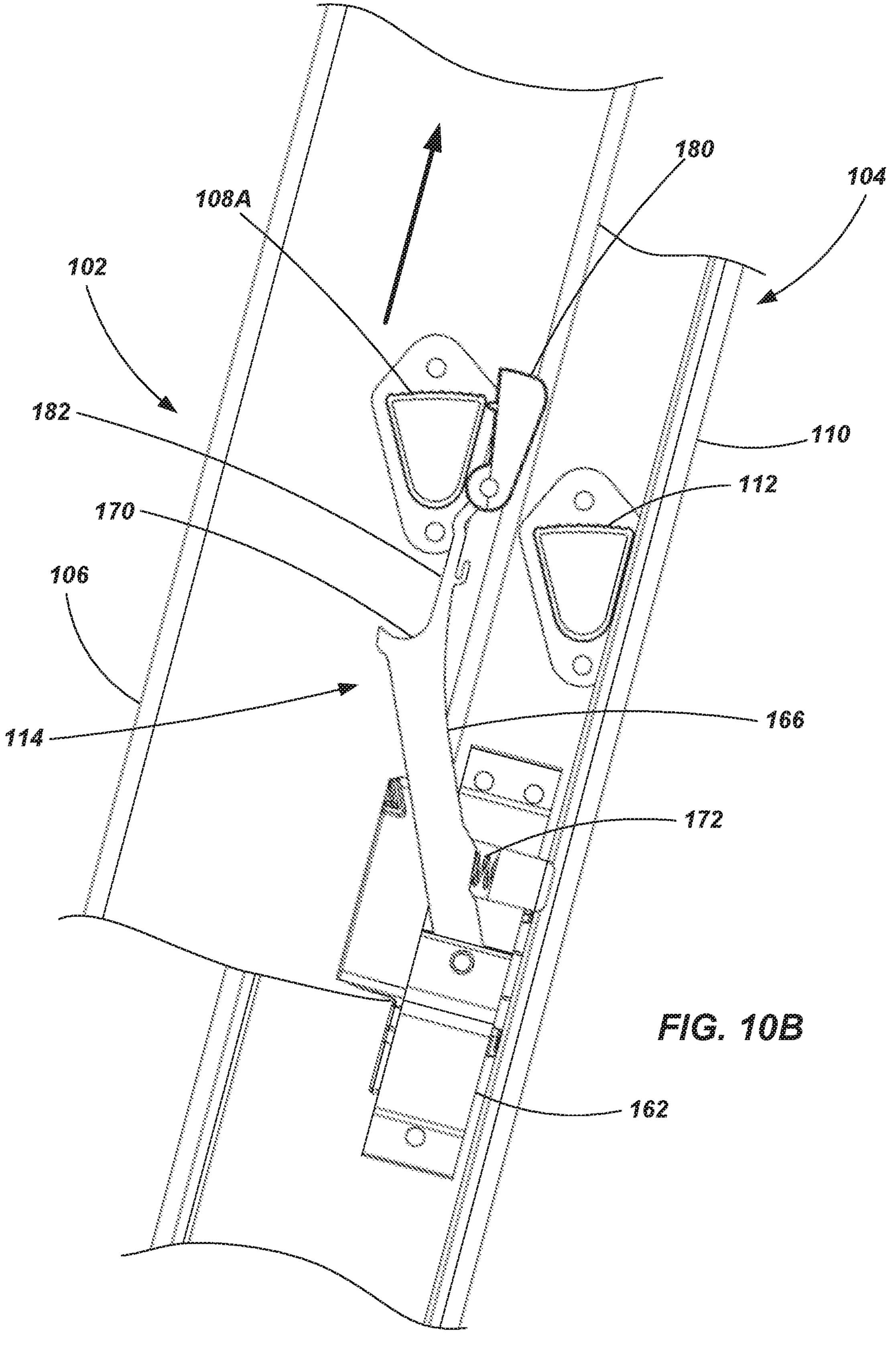

Referring more specifically to FIGS. 10A-10K, operation of a rung lock 114 according to one embodiment of the invention is shown and described. As seen in FIG. 10A, the rung lock 114 is engaged with a rung 108 (identified as rung 108A in FIGS. 10A-10C) of the fly section 102, maintaining the fly section 102 at a desired position relative to the base section 104. If a user desires to adjust the fly section 102 (either up or down) relative to the base section 104, they will initially displace the fly section 102 upward relative to the base section 104 (such as by using the rope 144, discussed above), causing the rung 108A to be displaced from the cup/support surface 170 as seen in FIG. 10B. The rung 108A additionally displaces the latch member 180 upwards such that it pivots relative to an extension member 182 of the arm 166. Further upward displacement of the fly section 102 relative to the base section 104 enables the rung 108A to clear the latch member 180, causing the biasing member associated with the latch member 180 to return the latch member 180 to the position shown in FIG. 10C.

Figure 10C:
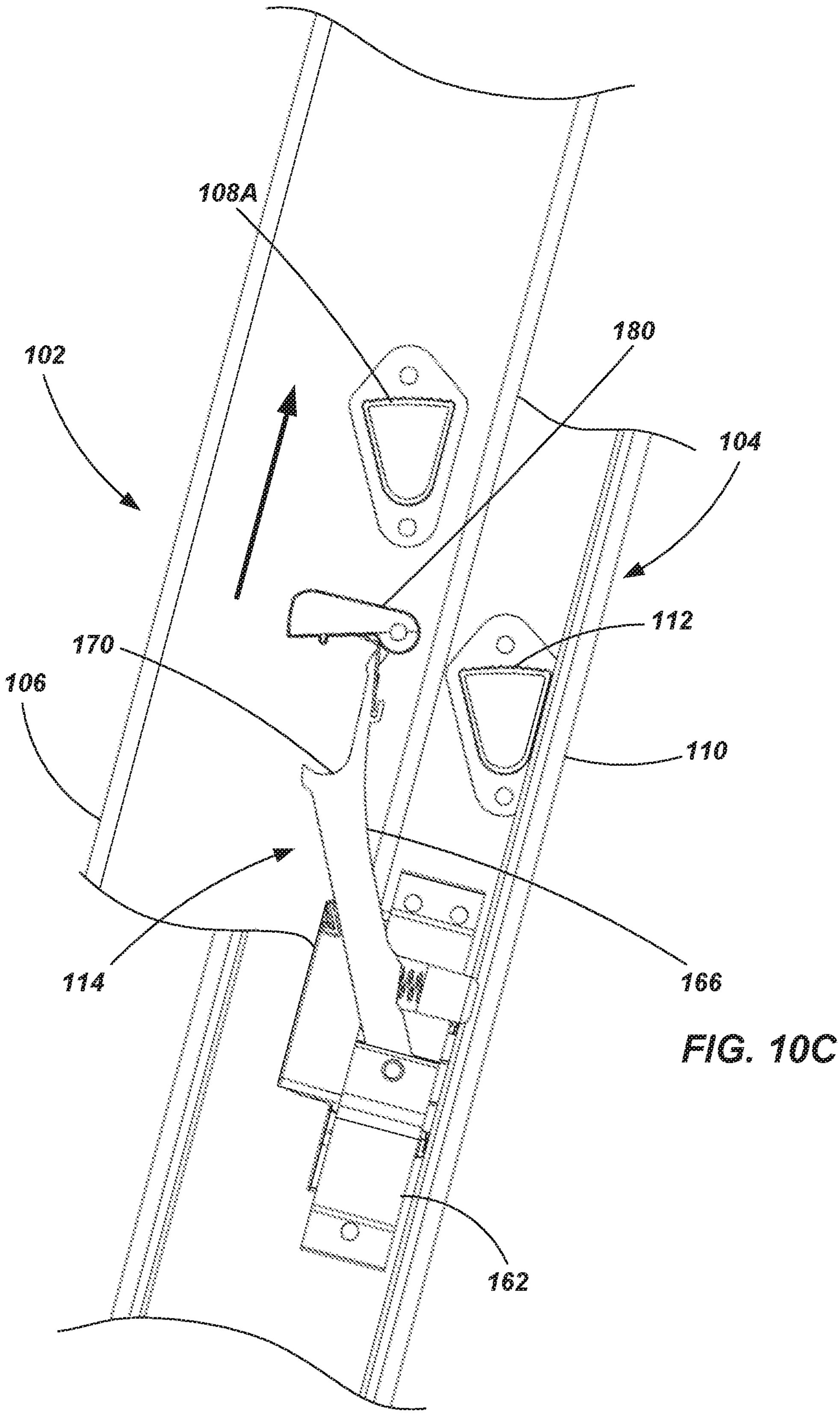
Figure 10D:
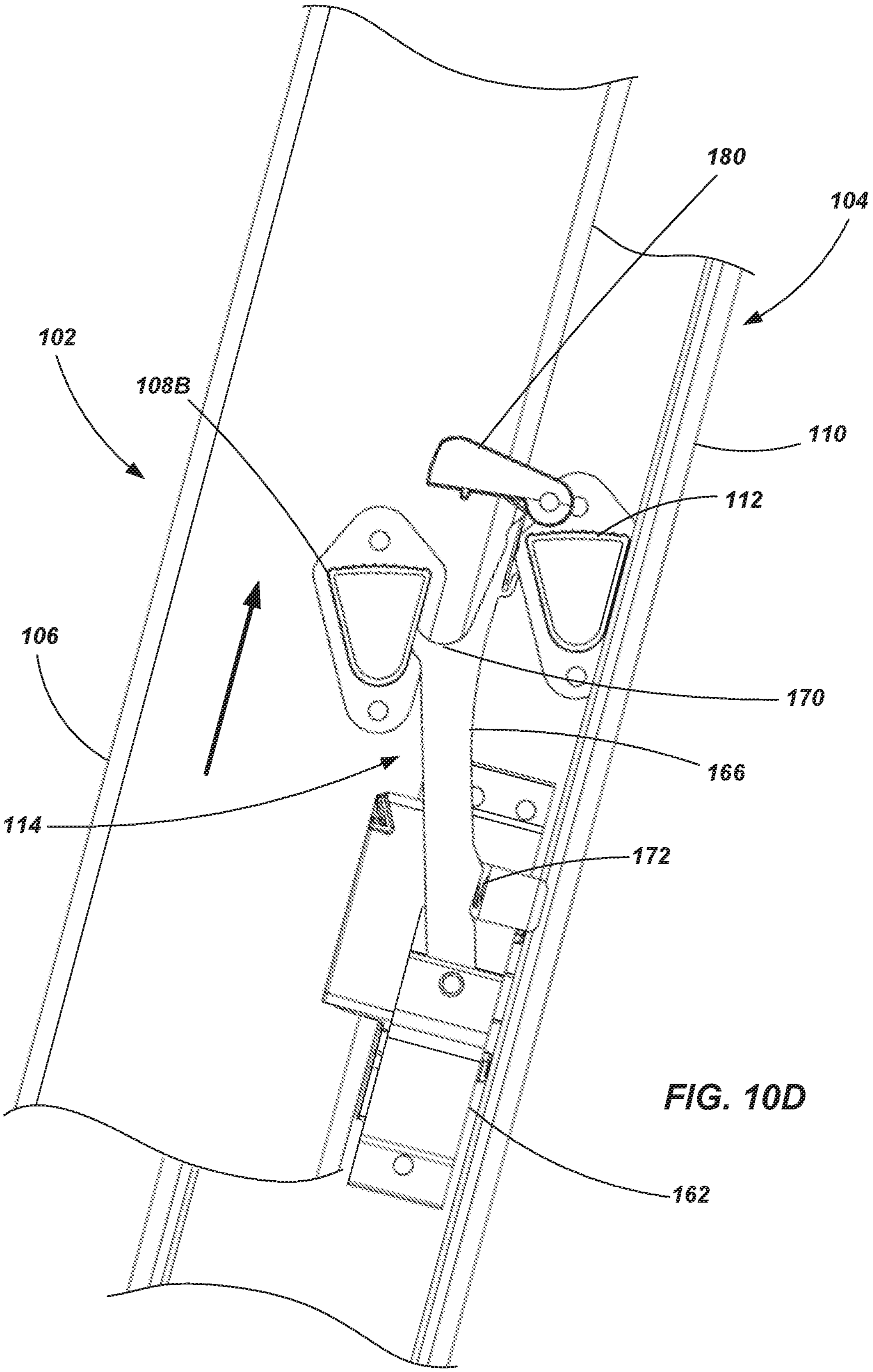
Figure 10E:
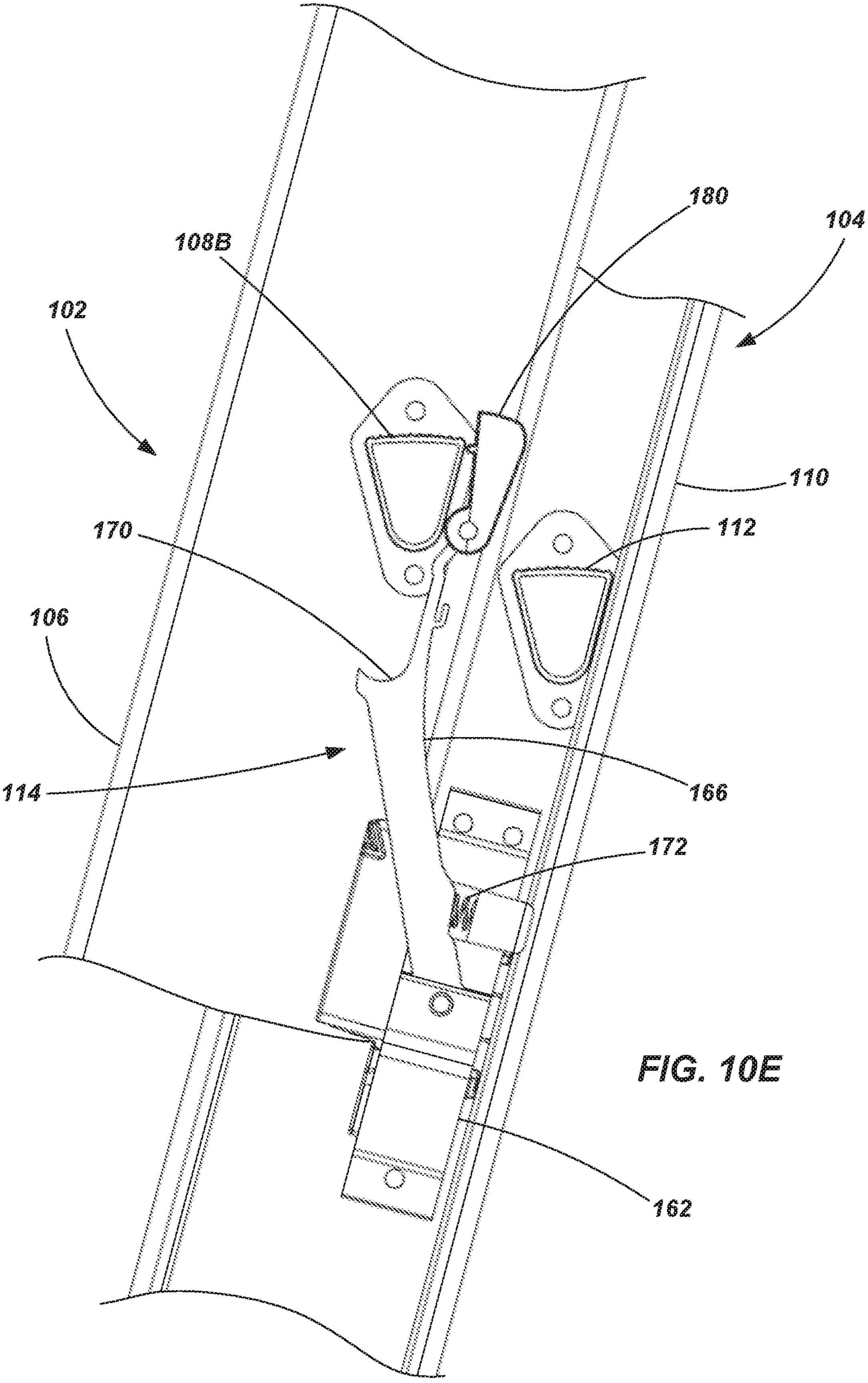
Figure 10F:
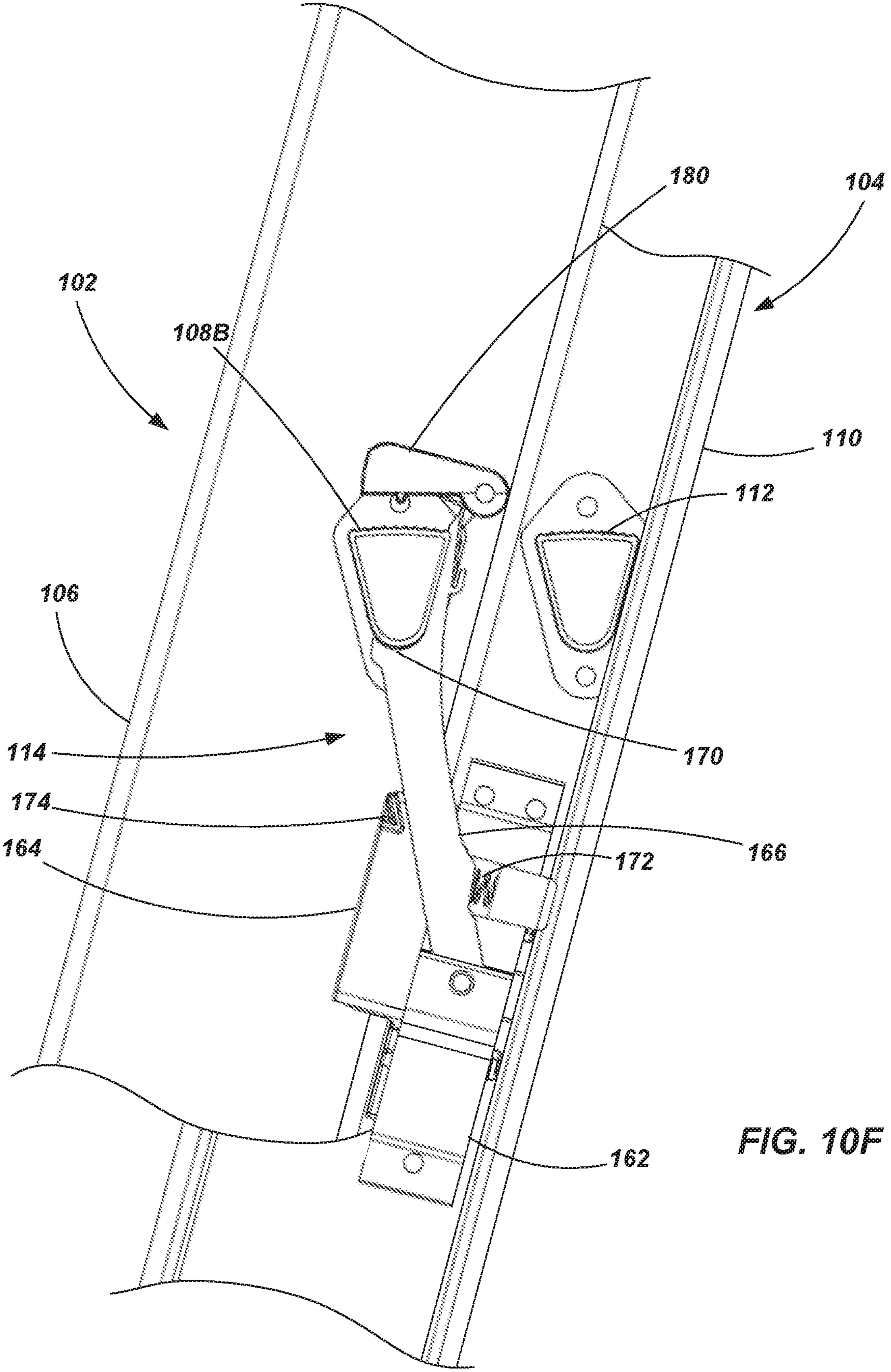

Assuming that the fly section 102 is to be adjusted upwards relative to the base section 104, the fly section 102 continues to move upwards until the next lower rung (labeled as 108B in FIGS. 10D-10F) engages a portion of the arm 166, pushing it out of the way of the rung 108B as seen in FIG. 10D. As the rung 108B is displaced slightly beyond the cup/support surface 170, it engages the latch member 180 and pushes it upwards (i.e., to an "open" position) as seen in FIG. 10E. At this point (assuming that this is the height at which the fly section 102 is to be maintained), the fly section 102 may be displaced back downwards slightly so that the bottom portion of the rung 108B rests in the cup/support surface 170 as shown in FIG. 10F.

Figure 10G:
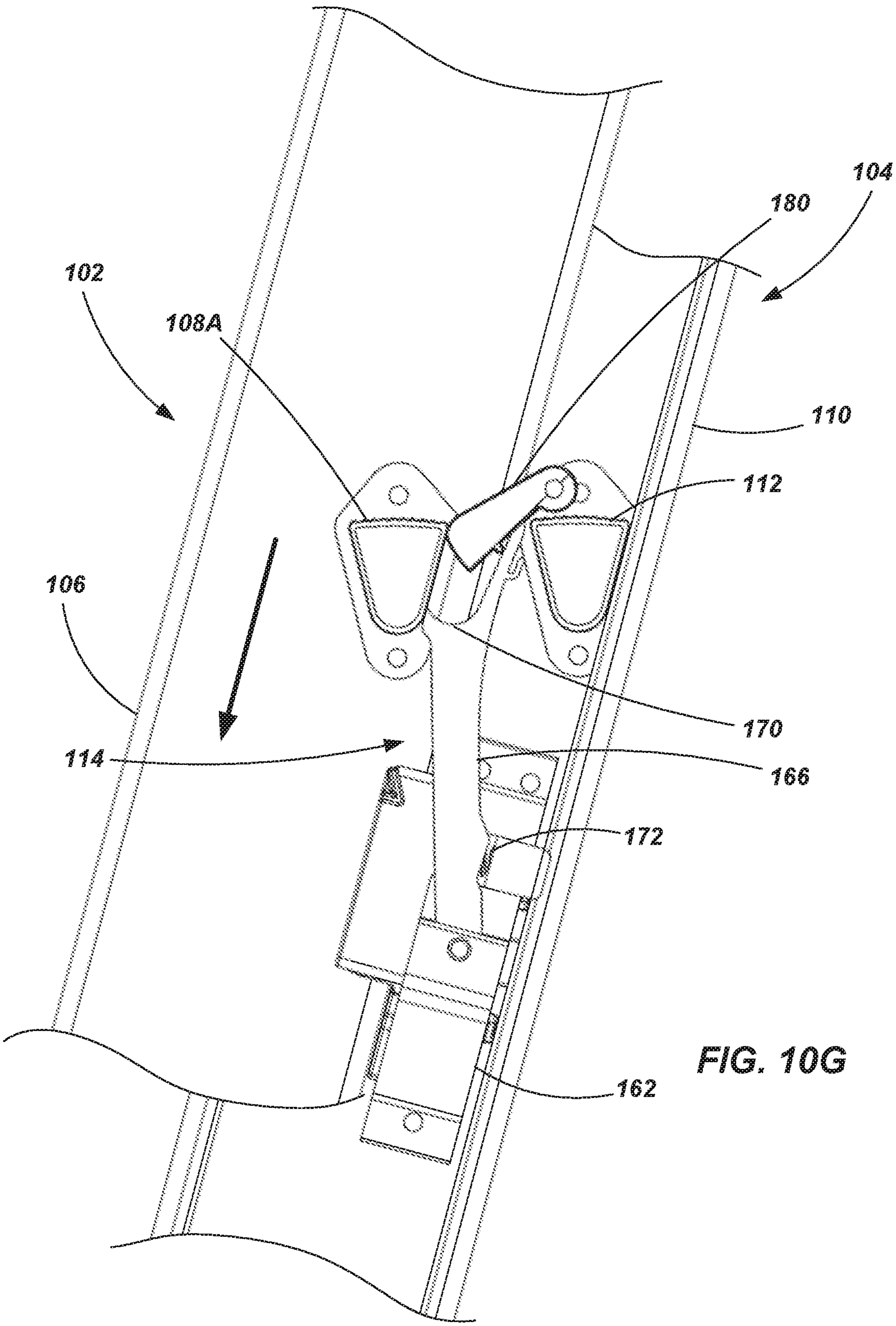
Figure 10H:
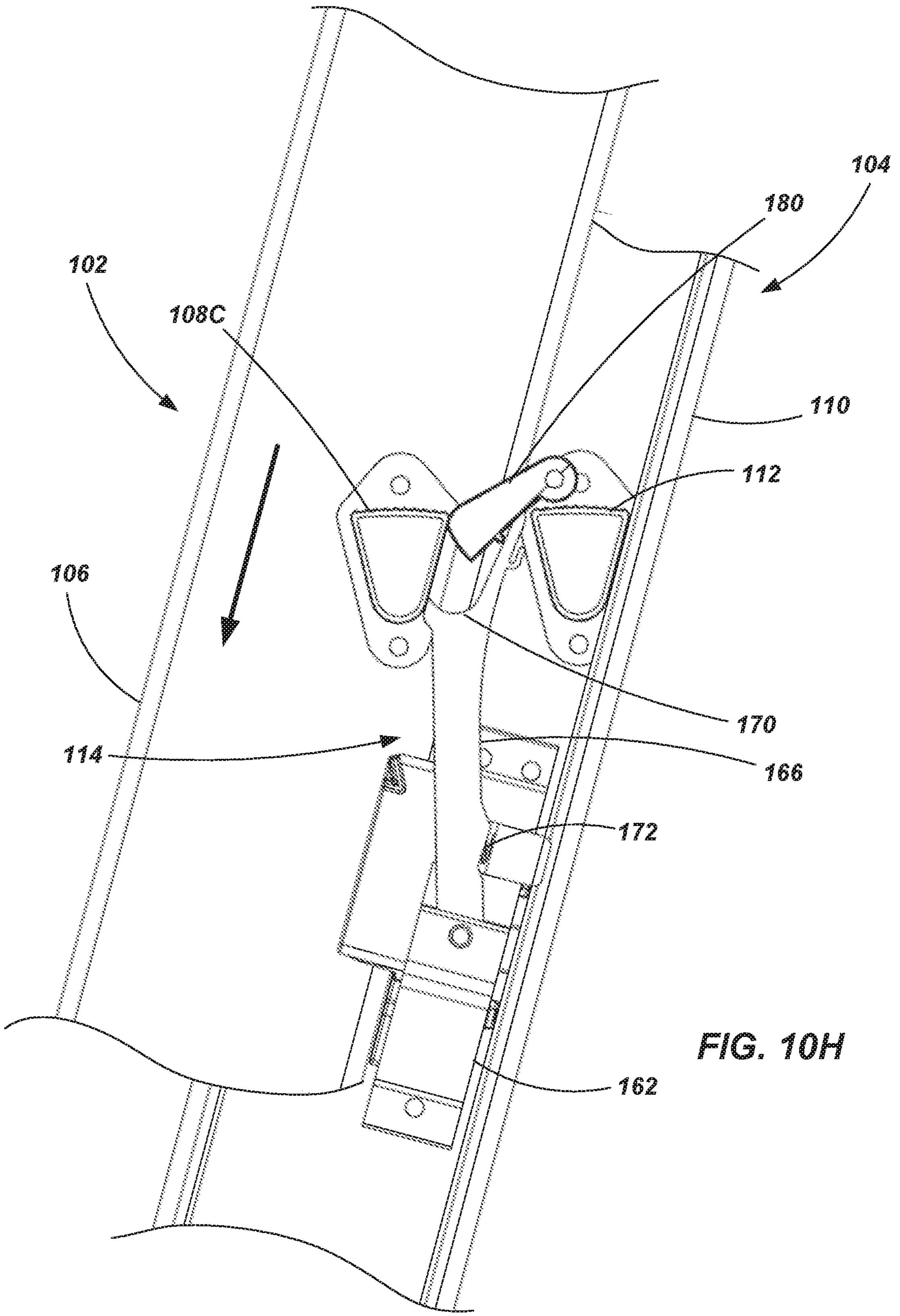
Figure 10I:
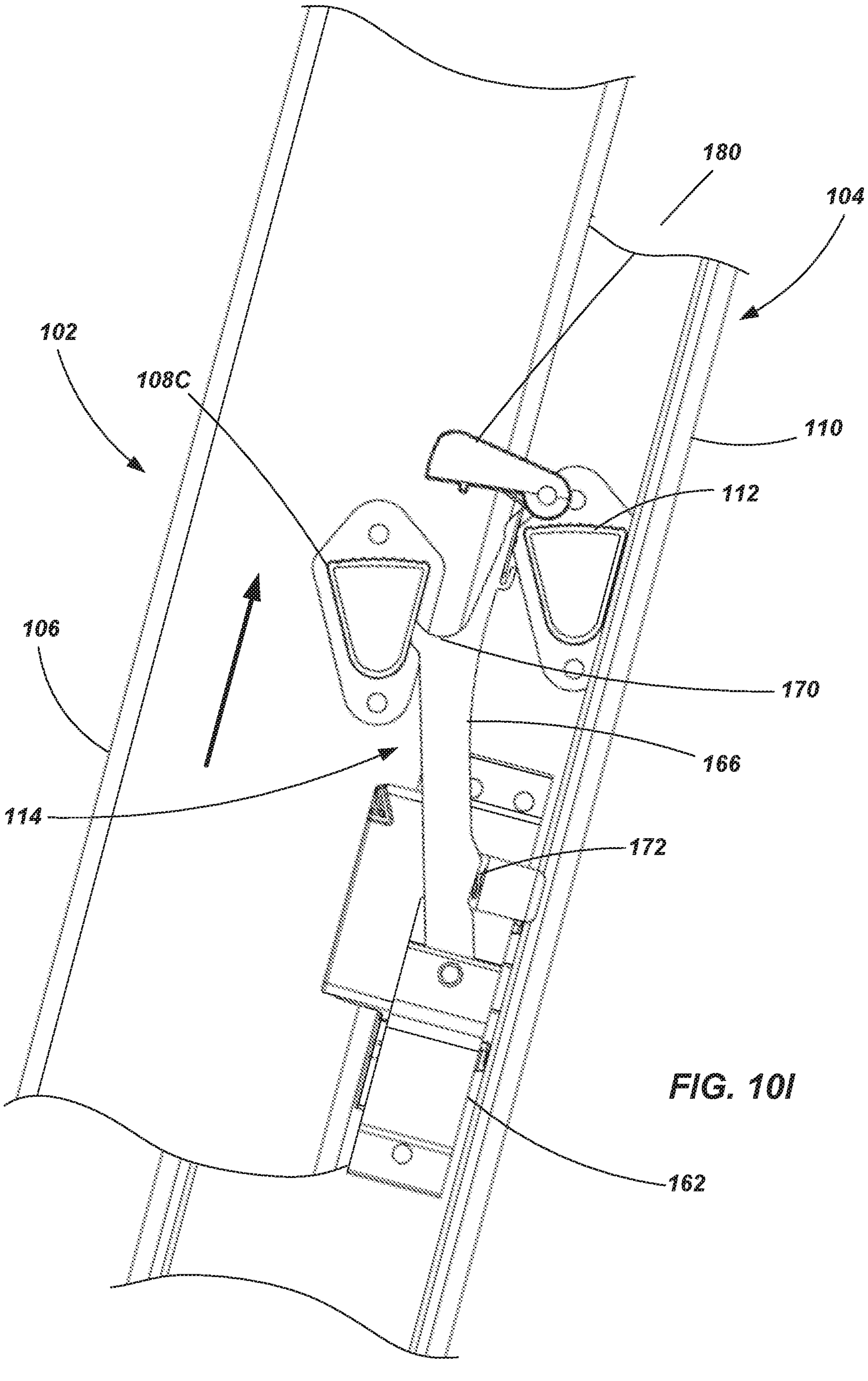
Figure 10J:
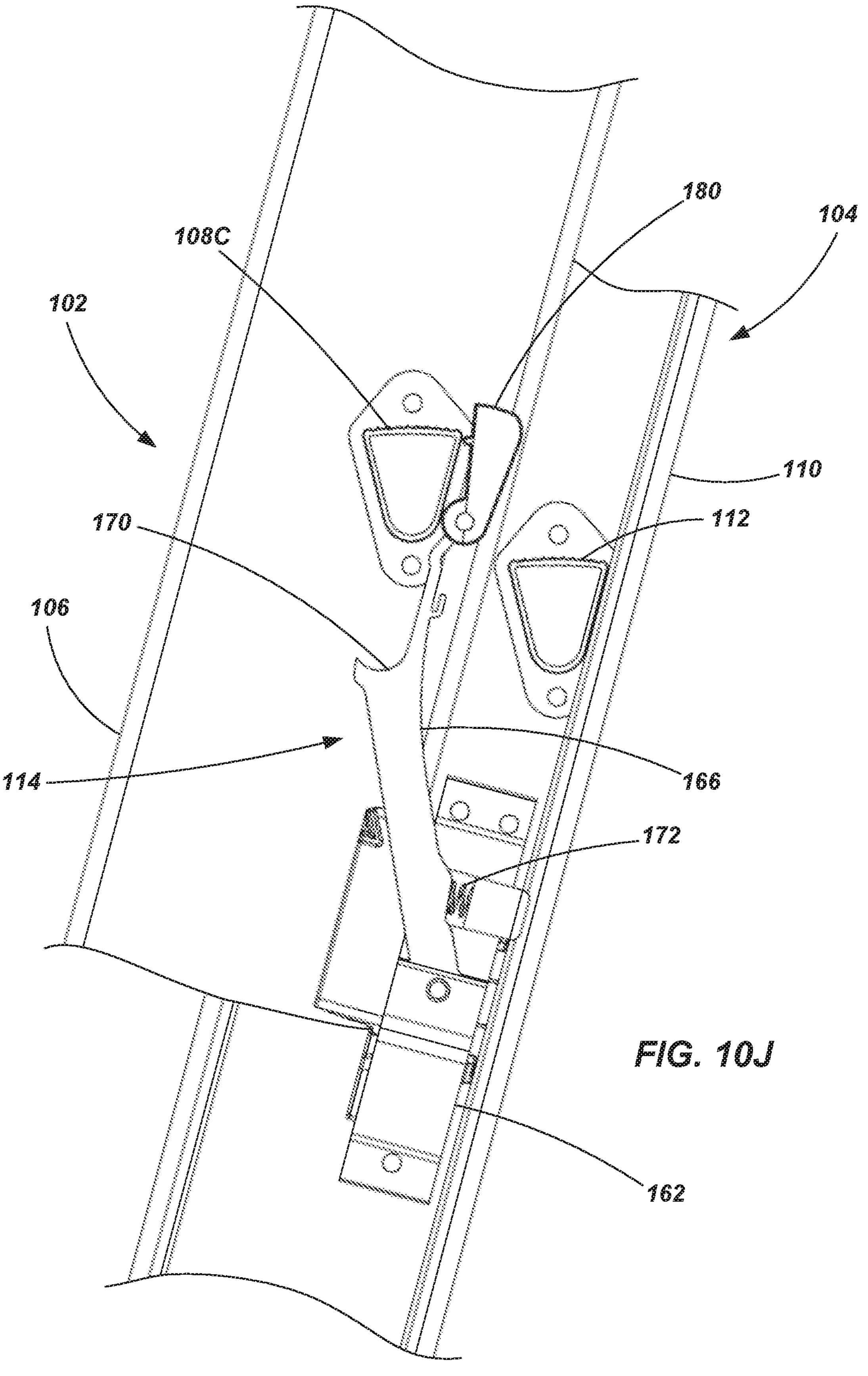
Figure 10K:
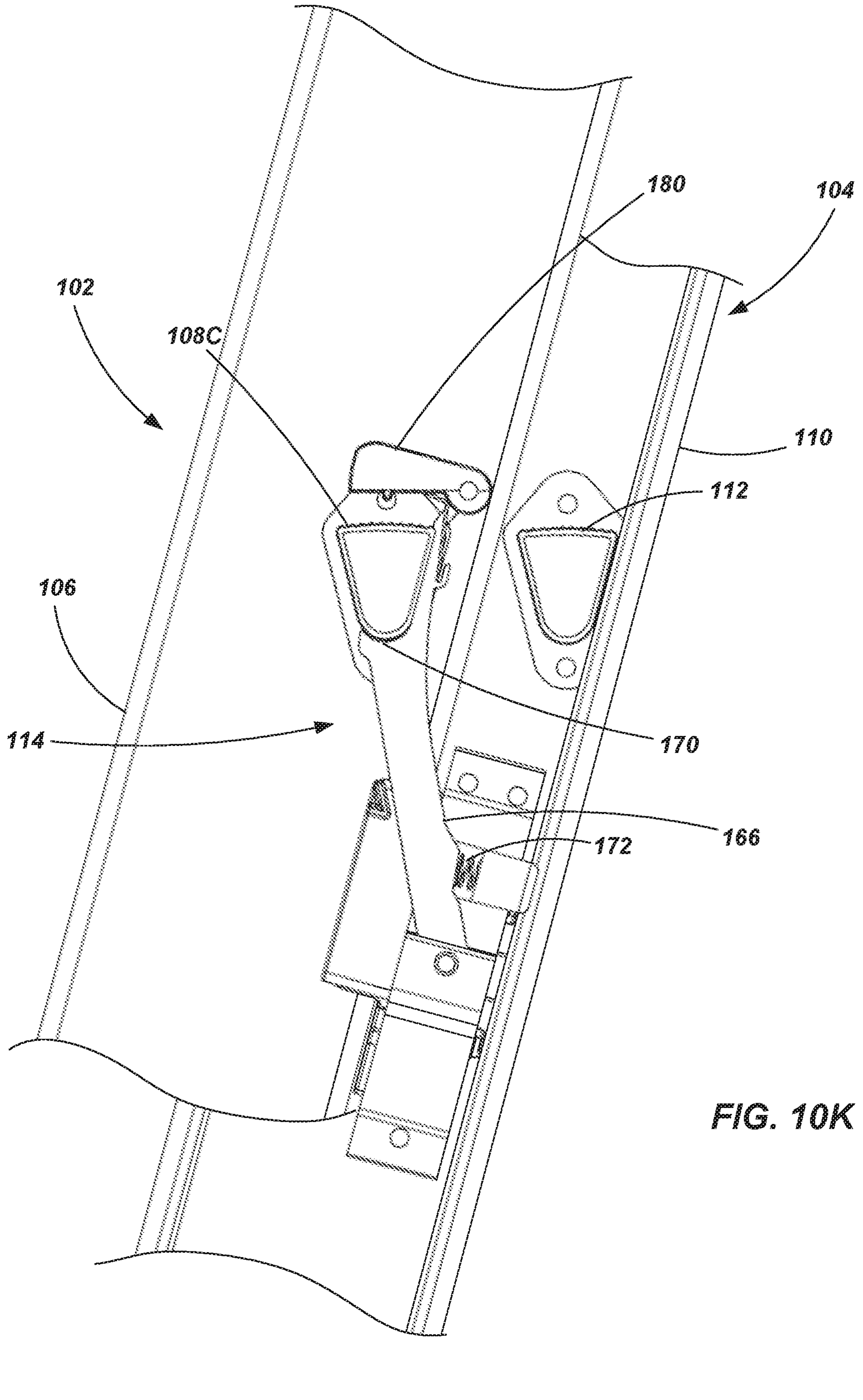

If the fly section 102 is to be lowered relative to the base section 104, the maneuvers or acts described with respect to FIGS. 10A-10C are effected and then the fly section 104 is lowered such that rung 108A displaces the latch member 180 (pivoting downward) and then additionally displaces the arm 166 away from the rung 108A as indicated in FIG. 10G. The next higher rung 108C similarly engages and displaces the latch member 180 and the arm 166 as depicted in FIG. 10H as the fly section 102 continues moving downward relative to the base section 104. Once the rung 108C has cleared the latch member 180 (i.e., has been displaced far enough downwardly that the latch member 180 returns to its preferred position as shown in FIG. 10I), the fly section 102 may be displaced back upwards relative to the base section 104, engaging the latch member 180 again, but displacing it upwards, as shown in FIG. 10J. The fly section 102 may then be displaced downwardly slightly so that the bottom surface of the rung 108C rests in, and is supported by, the cup/support surface 170 as shown in FIG. 10K.

Referring now to FIGS. 11A-11E (which, it is noted, include views showing only exemplary portions of the rails 106 and 110 for illustrative purposes), a rung lock 200 is shown in accordance with another embodiment of the invention. The rung lock 200 includes a bracket 202 coupled with a rail 110 of the base section 104. While not specifically shown, the rung lock 200 may include a guide member to slidingly engage a surface of the fly section 102 such as described above. An arm 204 is pivotally coupled with the bracket member 202 and includes a cup or support surface 206 configured to engage a lower surface of the rungs 108 of the fly section 102. A biasing member 208 may associated with the arm 204 to bias it towards the position shown in FIG. 11A. In one embodiment, the biasing element 208 may include a pivot spring associated with pivot point of the arm 204 located on the bracket 202. In other embodiments, the biasing member may include a coil spring or other element such as described above.

Figure 11A:
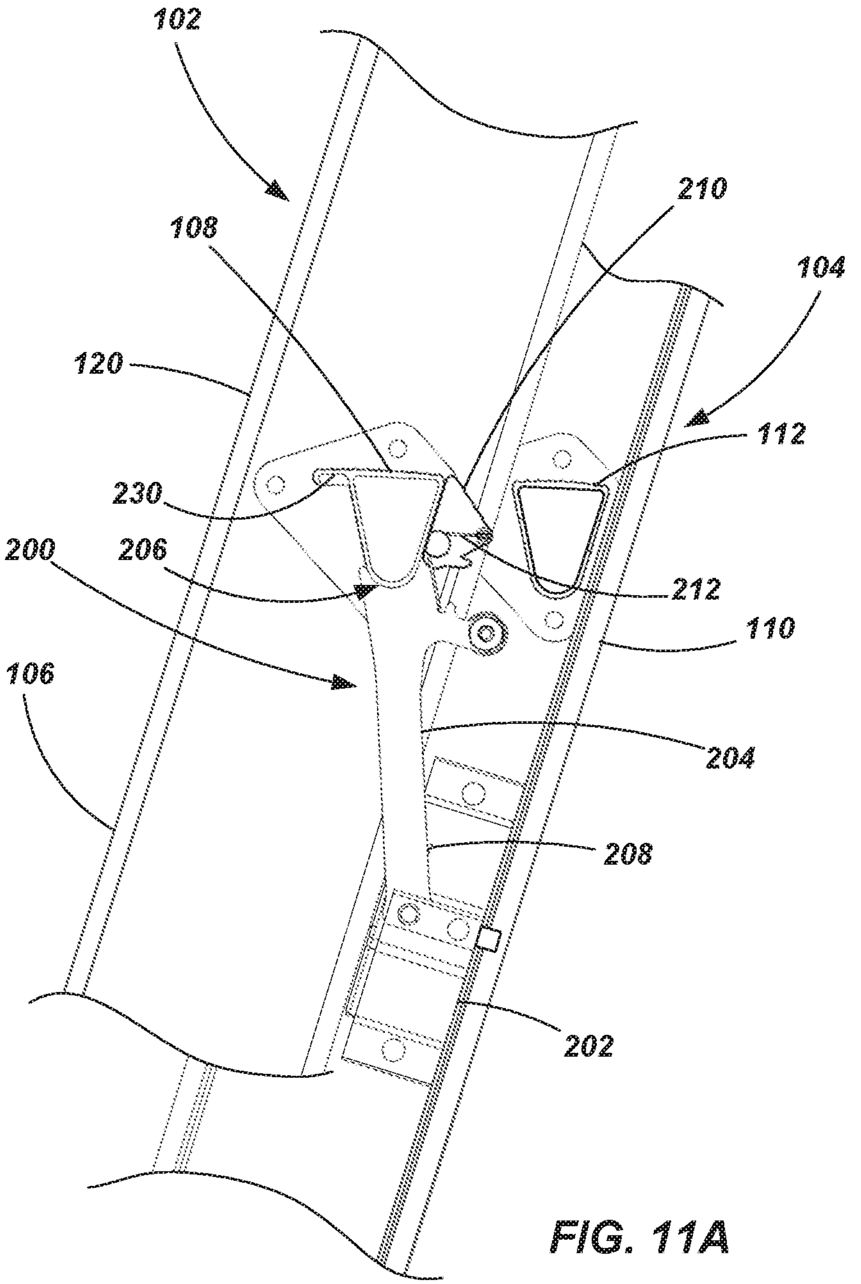
FIGS. 11A-11E show a portion of a ladder, including a rung lock in various states or conditions of use in accordance with another embodiment of the invention.
Figure 11B:
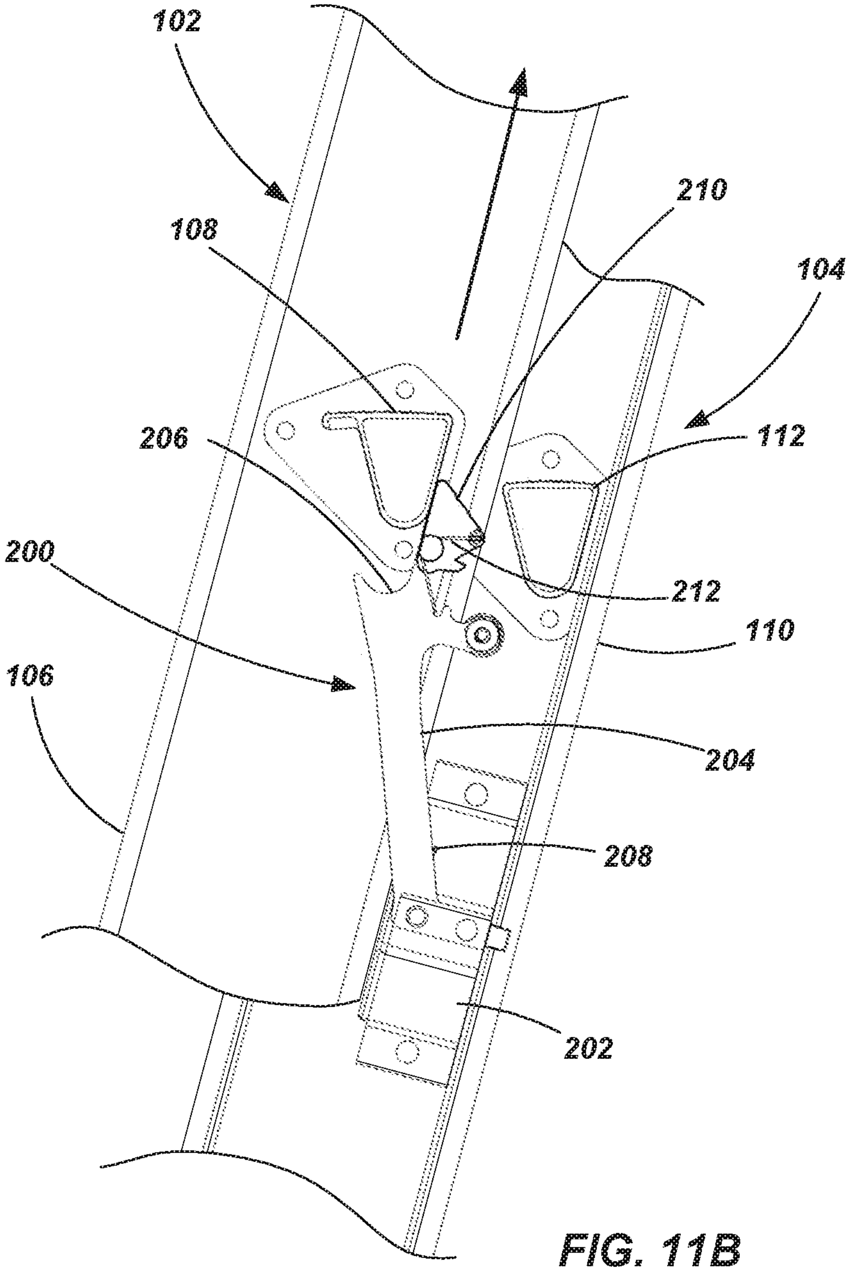
Figure 11C:
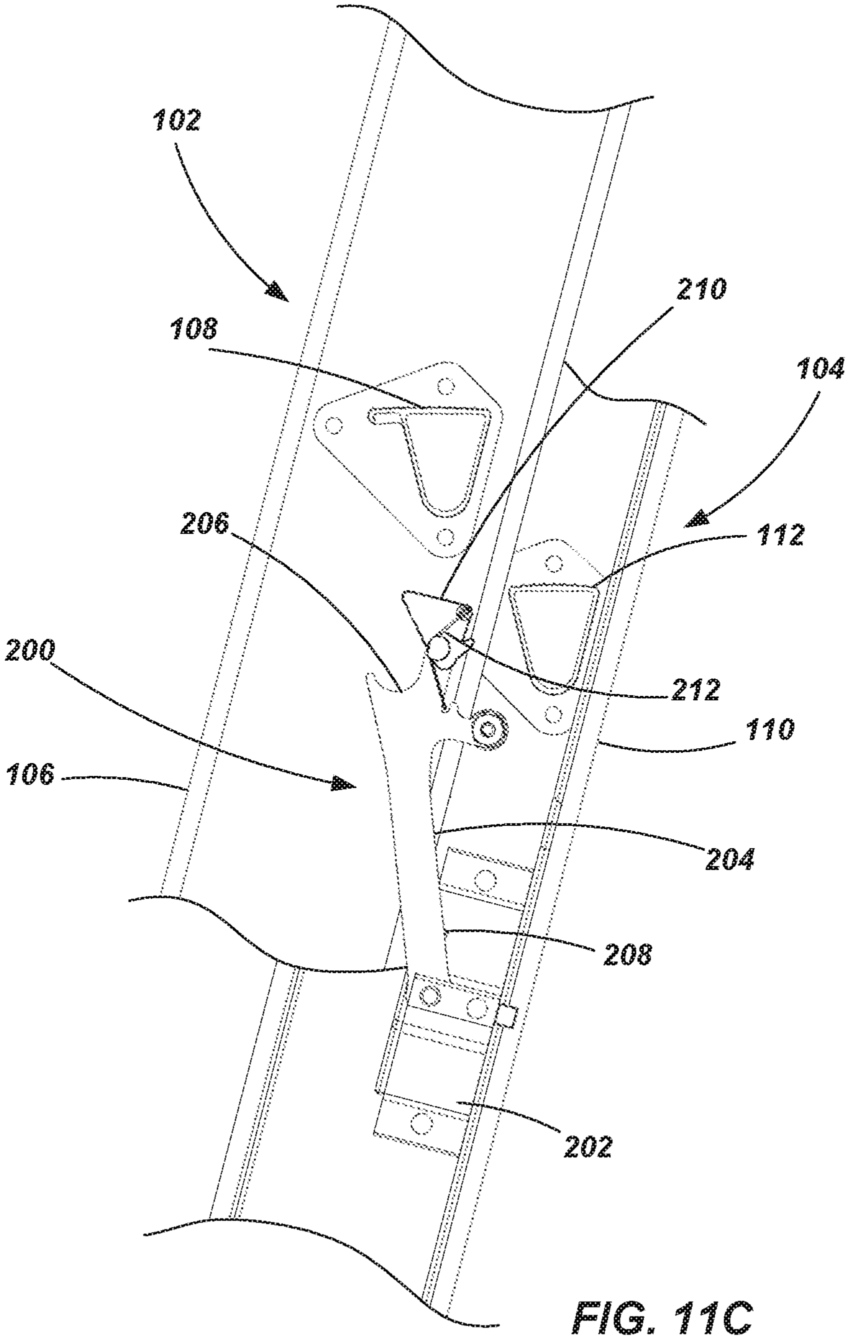
Figure 11D:
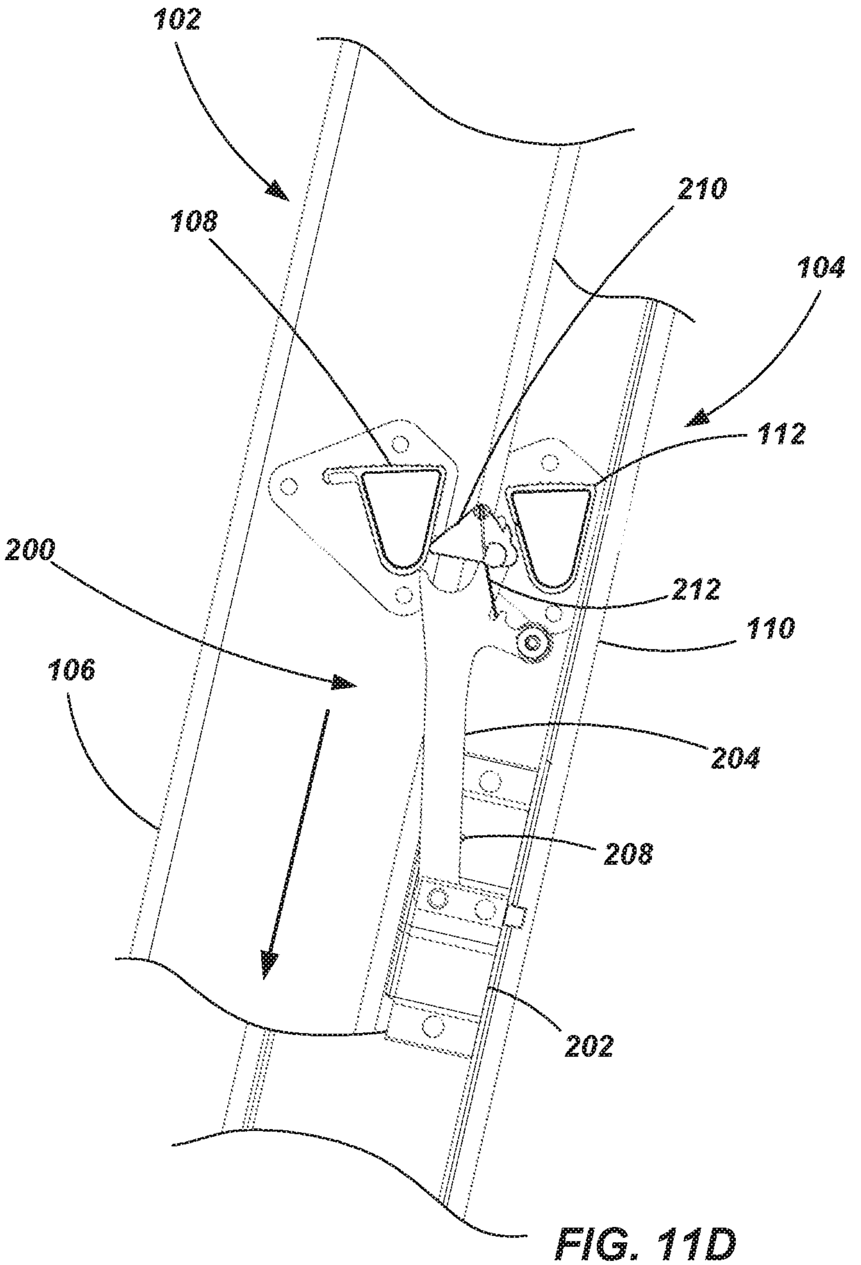

The rung lock 200 may additionally include an adjustment flipper 210 (also referred to as a pivoting guide member) that is pivotally coupled with the arm 204 adjacent the cup or support surface 206. The flipper 210 may be biased towards a desired position (e.g., the position shown in FIG. 11C) by a pivot spring 212 or other appropriate biasing member. As seen in FIG. 11A, when the rung lock 200 is engaged with a rung 108, the uppermost portion of the rung lock 200, which is located on the adjustment flipper 210, does not exceed (although it may equal) the height of the upper surface of the rung 108. Thus, the rung lock 200 is configured such that no component intrudes onto the useable area of the rung. In other words, unlike traditional rung lock mechanisms, the entire upper surface of the rung 108 that is engaged by the rung lock 200 is available for the user to stand on. As seen by comparing FIGS. 11A-11D, the flipper 210 is displaced upon adjustment of the fly section 102 relative to the base section, and it operates in a generally similar manner as described above with respect to the latch member 180 in terms of engaging and disengaging the rungs 108 of the fly section 102.

Figure 11E:
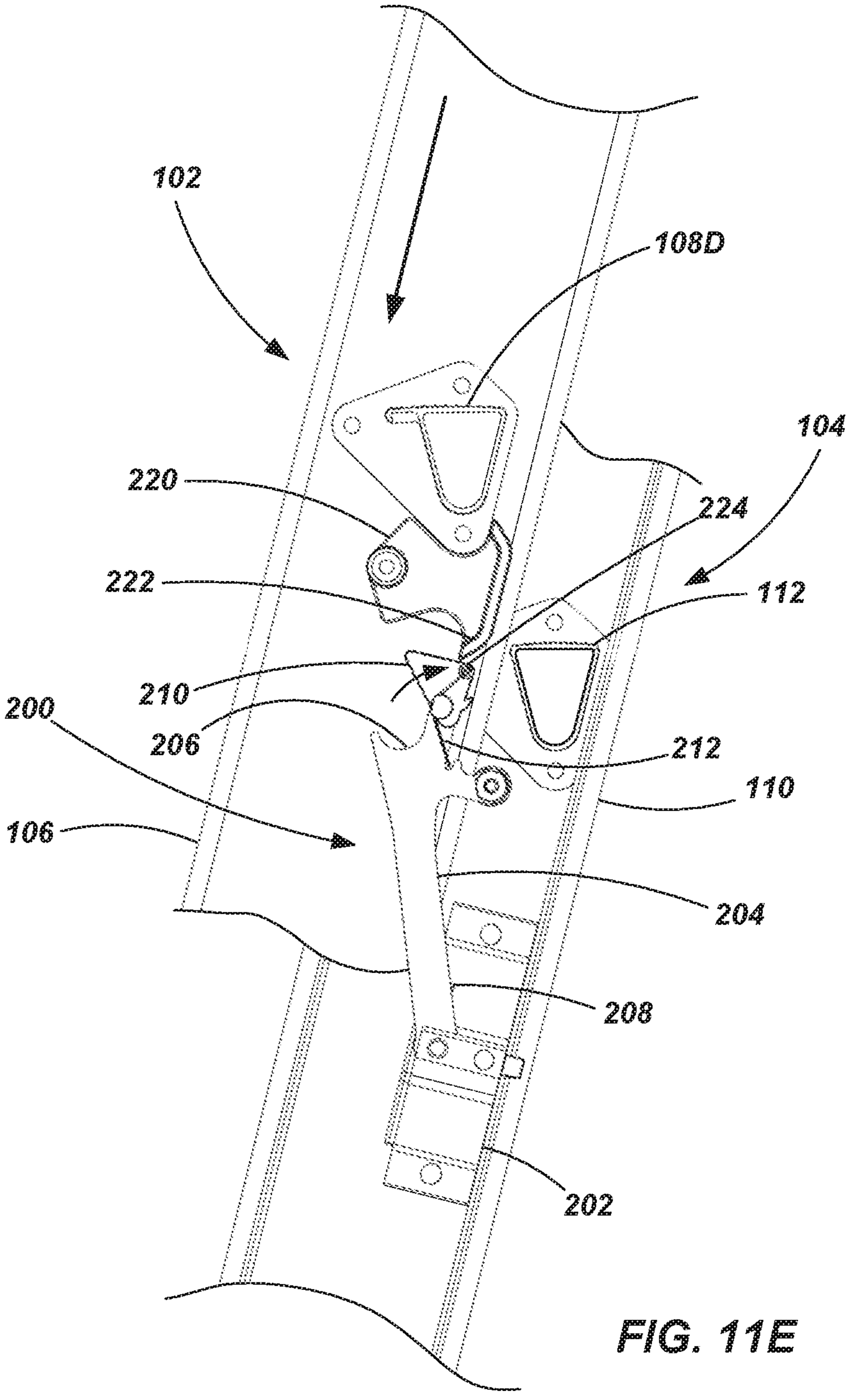

As shown in FIG. 11E, when the fly section 102 is adjusted to its lowermost state relative to the base section 104 (i.e., the ladder 100 is collapsed to its shortest state), a device 220 is associated with the rung (labeled 108D) that is to be engaged by the rung lock 200 at that position. In conventional, prior art extension ladders, the fly section has to be dropped so that the rung (e.g., 108D) drops below the rung lock, then is raised so that the rung is slightly above a portion of the rung lock, and then lowered again to engage the rung lock. The device 220 associated with the rung 108D is configured such that the rung lock 200 automatically engages the rung 108D without the standard "drop-raise-drop" maneuver of the fly section 104 required by conventional prior art extension ladders. In operation, the device 220 includes an abutment wall 222 which may engage a portion of the adjustment flipper 210 (e.g., a protrusion 224 or other feature or surface of the flipper 210) such that it pushes the adjustment flipper 210 back (towards the base section 104), enabling the cup or support surface 206 to immediately engage the lower surface of the rung 108D upon lowering of the fly section 102 to that extent. Again, the device 220 is only associated with the rung 108D that corresponds with the fly section 102 being fully retracted or collapsed when that rung (108D) is located for engagement with the rung lock 200.

It is also noted that FIGS. 11A-11E show an additional embodiment of a rung profile. Referring, for example, to FIG. 11A, the rung 108 of the fly section 102 exhibits a slightly different profile than the rung 112 of the base section. The rung of the base section 112 is configured substantially similar to that which is described above (e.g., see FIG. 2). The rung 108 of the base section includes some similarities to the base rung 112 (e.g., front and rear surface, lower surface), but includes an upper surface having an extension 230 that extends beyond the front wall or front surface of the rung (i.e., in the direction towards the front surface 122 of the rails 106 of the fly section 102). This cantilevered extension 230 provides additional depth to the rung surface, which may make the rung safer and more comfortable for a user to stand on. In one embodiment, such a rung profile may also be used in association with the base section 104. However, use of the two different rung profiles enables a more compact arrangement of the fly section 102 and base section 104 (e.g., a smaller overall depth of the ladder) while providing increased surface area in the locations a user is most likely to be standing when using the ladder (i.e., the rungs 108 of the fly section 102).

Referring now to FIGS. 12A-12G (which, it is noted, include views showing only exemplary portions of the rails 106 and 110 for illustrative purposes), a rung lock 250 is shown in accordance with another embodiment of the invention. The rung lock 250 includes a bracket 252 coupled with a rail 110 of the base section 104. An arm 254 is pivotally coupled with the bracket member 252 and includes a cup or support surface 256 configured to engage a lower surface of the rungs 108 of the fly section 102. While not specifically shown in FIGS. 12A-12G, a biasing member may be associated with the arm 254 to bias it towards the position shown in FIG. 12A such as has been described with respect to previously disclosed embodiments. In one embodiment, the biasing element may include a pivot or torsional spring associated with pivot point (e.g., a shaft 258) of the arm 254 which may also be coupled with the bracket 252. In other embodiments, the biasing member may include a coil spring or other element such as described above in association with other embodiments.

An adjustment flipper 260 (also referred to as an pivoting guide member) is pivotally coupled with the rail 110 of the base section 104 (or to a bracket which is coupled with the rail) at a location above the arm 254 (when the ladder is oriented for intended use, such as shown in FIGS. 12A-12G). The flipper 260 may be biased towards a desired, neutral position (e.g., the position shown in FIG. 12A) by a pivot or torsional spring or other appropriate biasing member. As seen by comparing FIGS. 12A-12G, the flipper 260 is displaced (e.g., pivoted about a shaft 262) upon adjustment of the fly section 102 relative to the base section 104, and it operates in a generally similar manner as described above with respect to the adjustment flipper 210 or the latch member 180 in terms of engaging and disengaging the rungs 108 of the fly section 102.

Figure 12A:
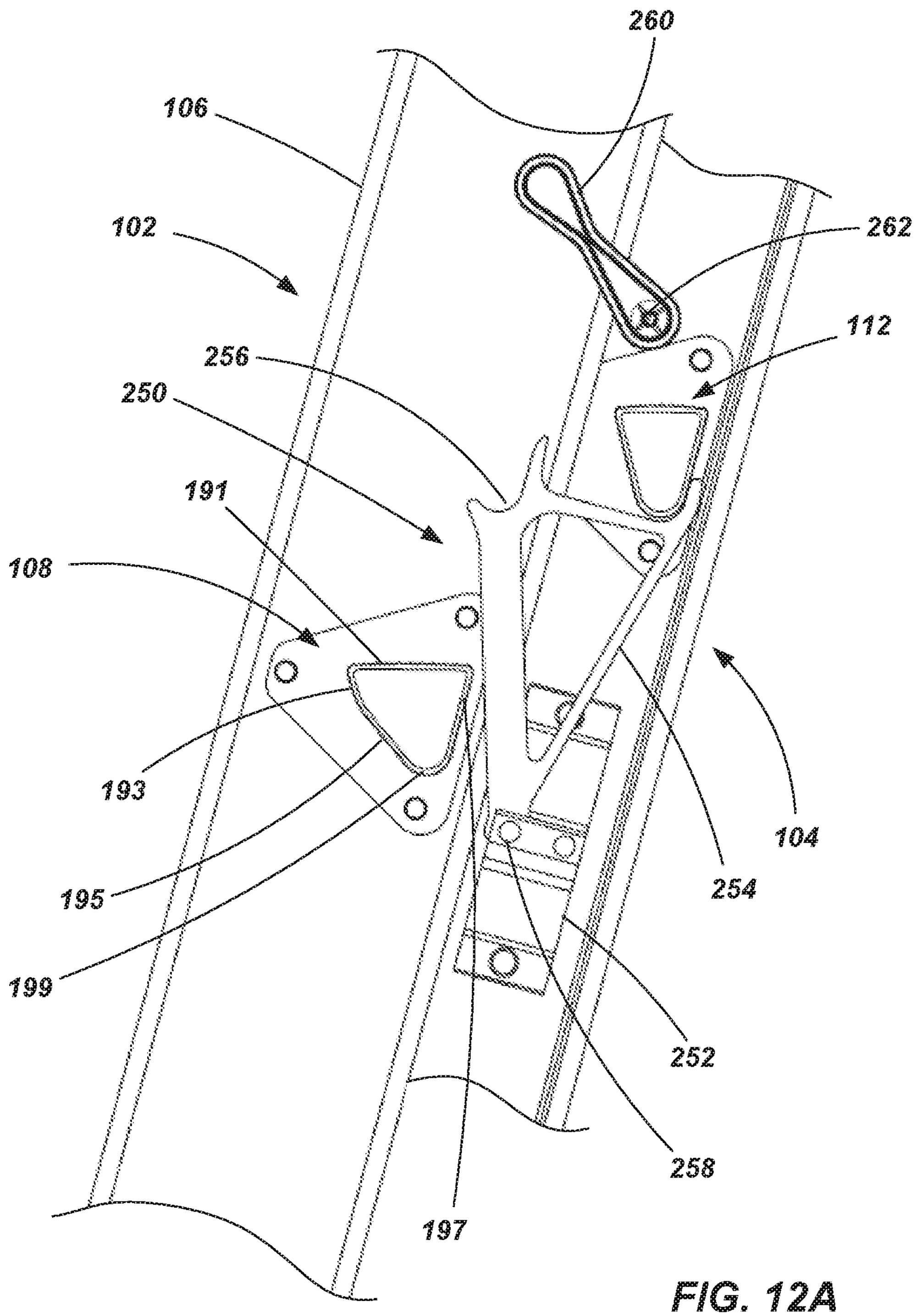
FIGS. 12A-12G show a portion of a ladder, including a rung lock in various states or conditions of use according to an embodiment of the invention.
Figure 12B:
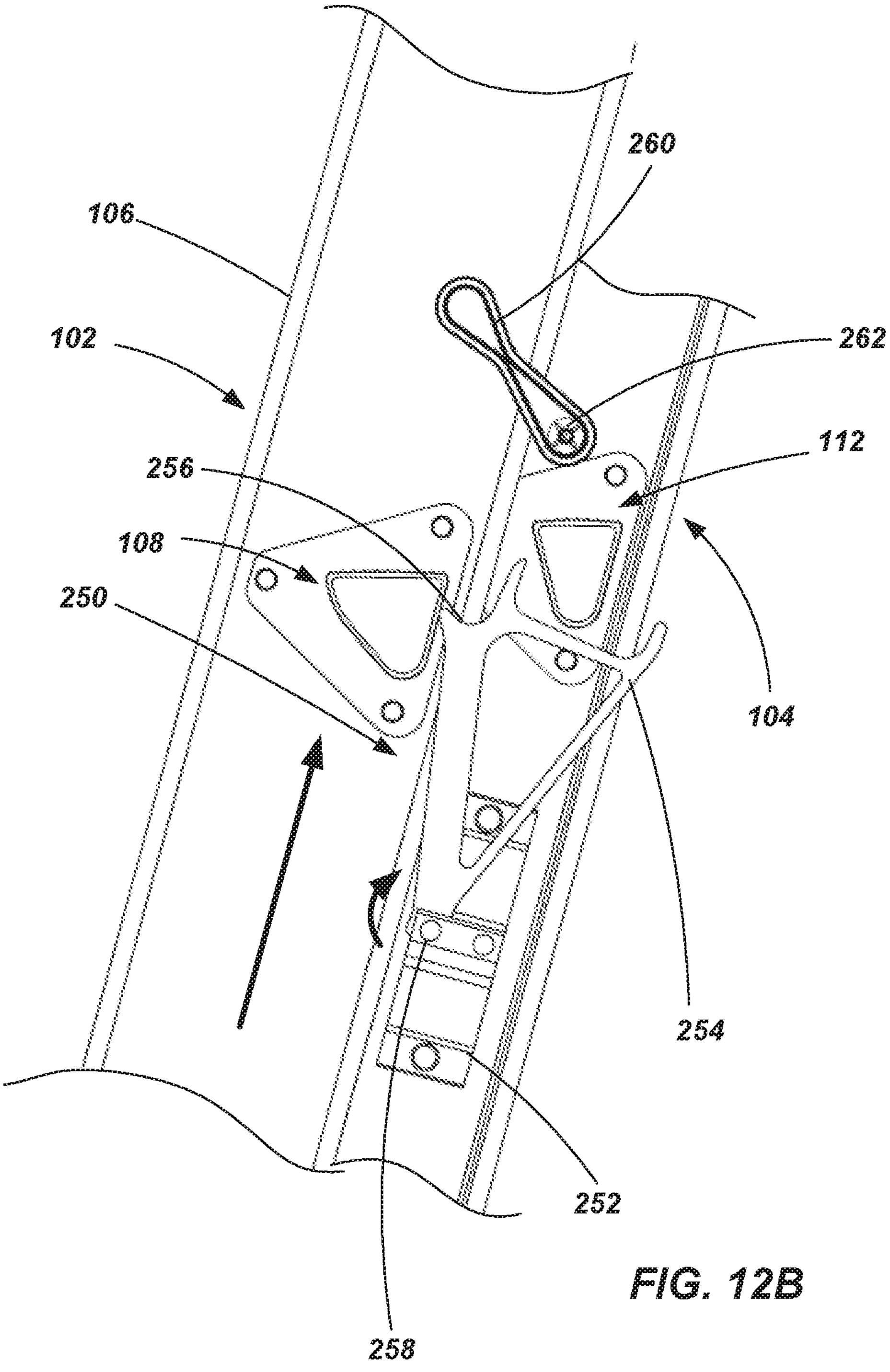
Figure 12C:
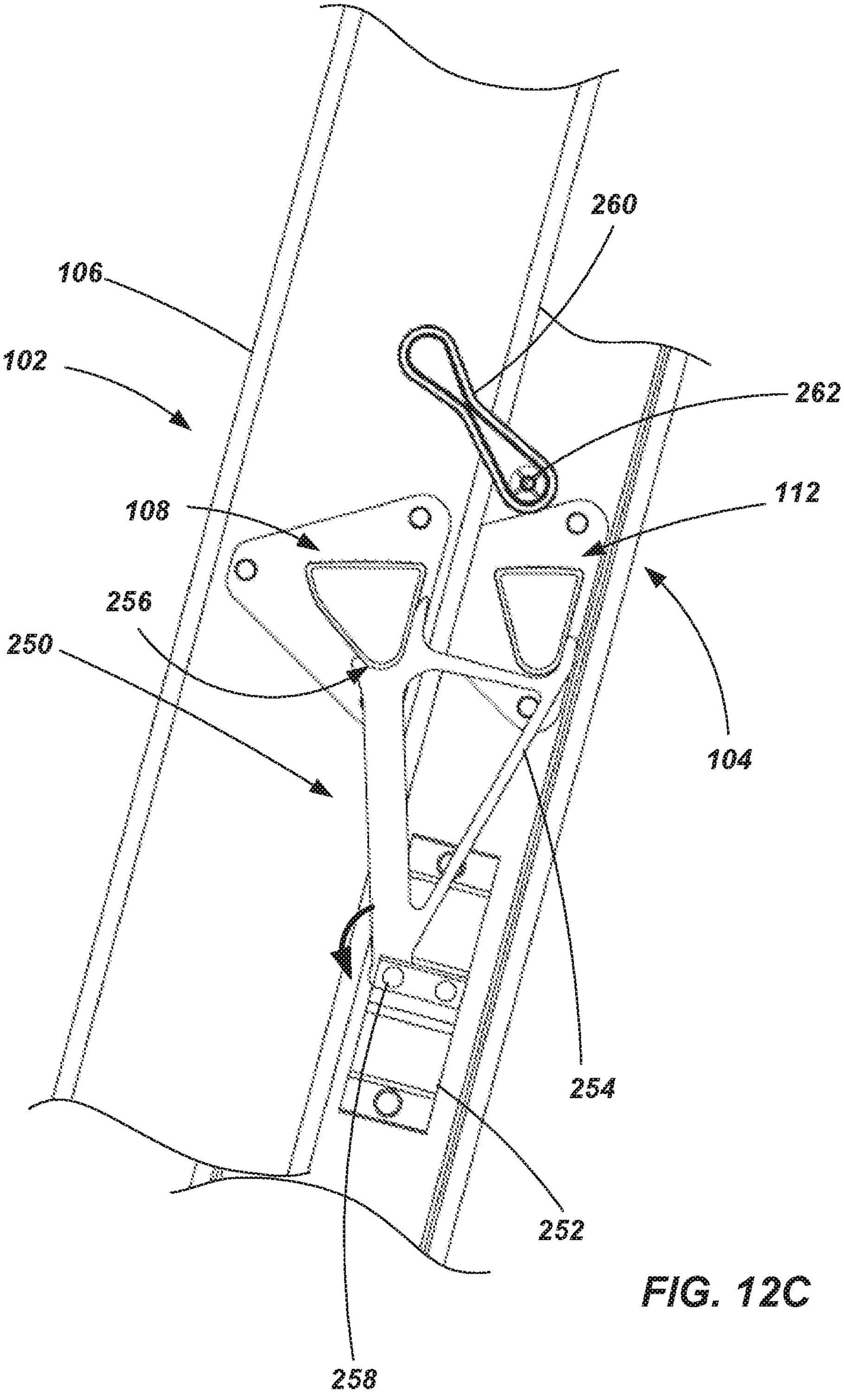
Figure 12D:
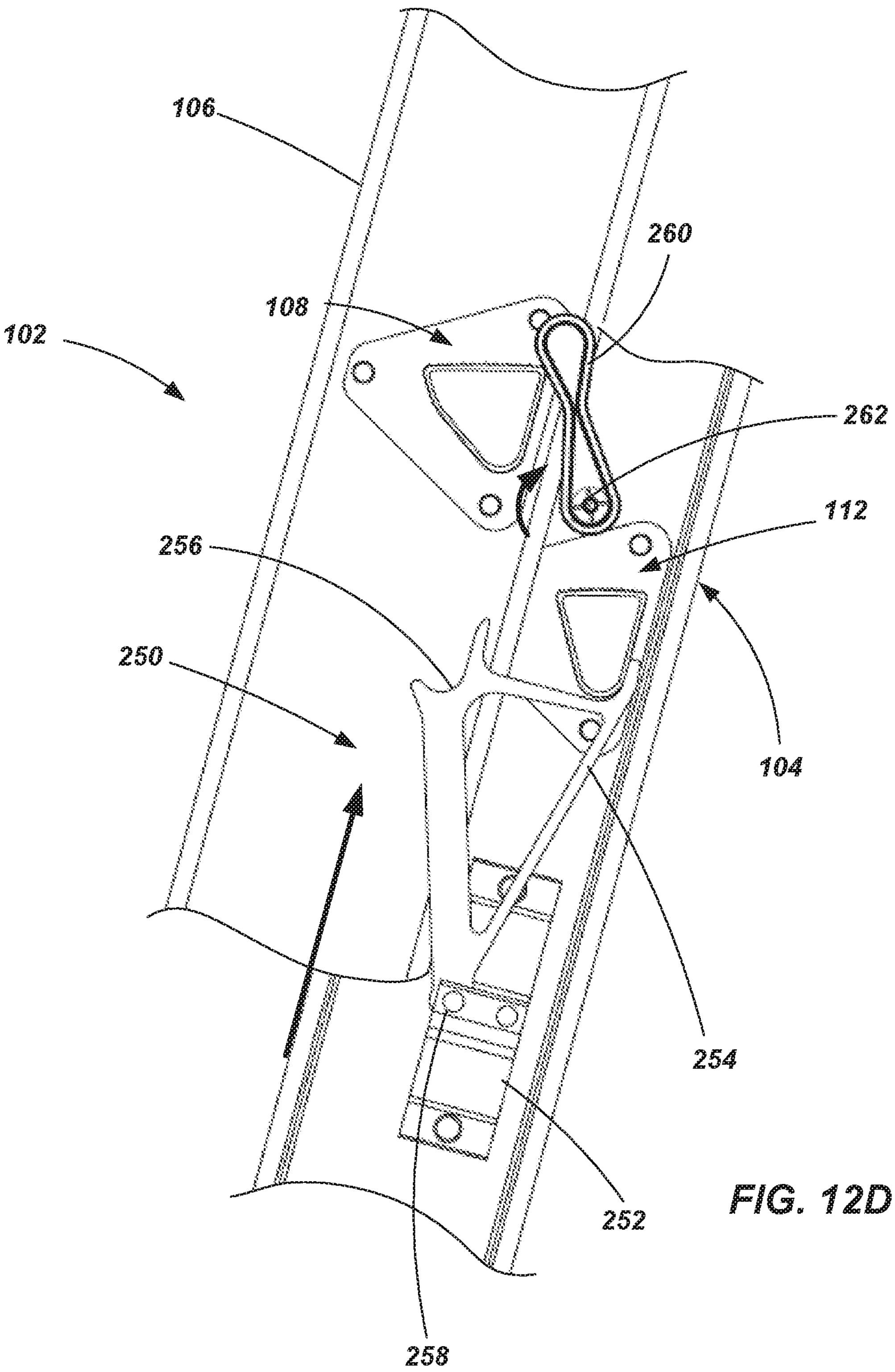
Figure 12E:
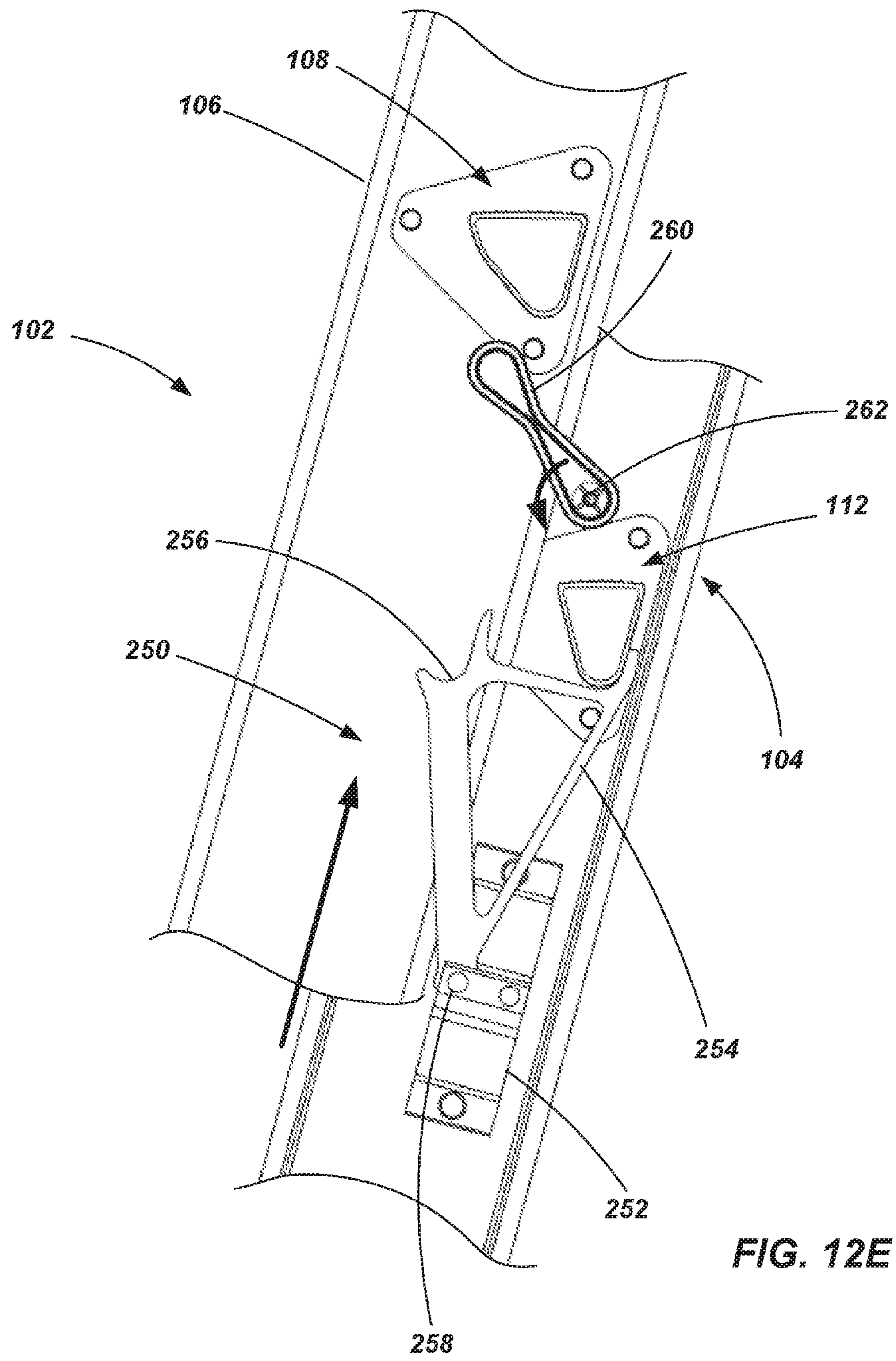
Figure 12F:
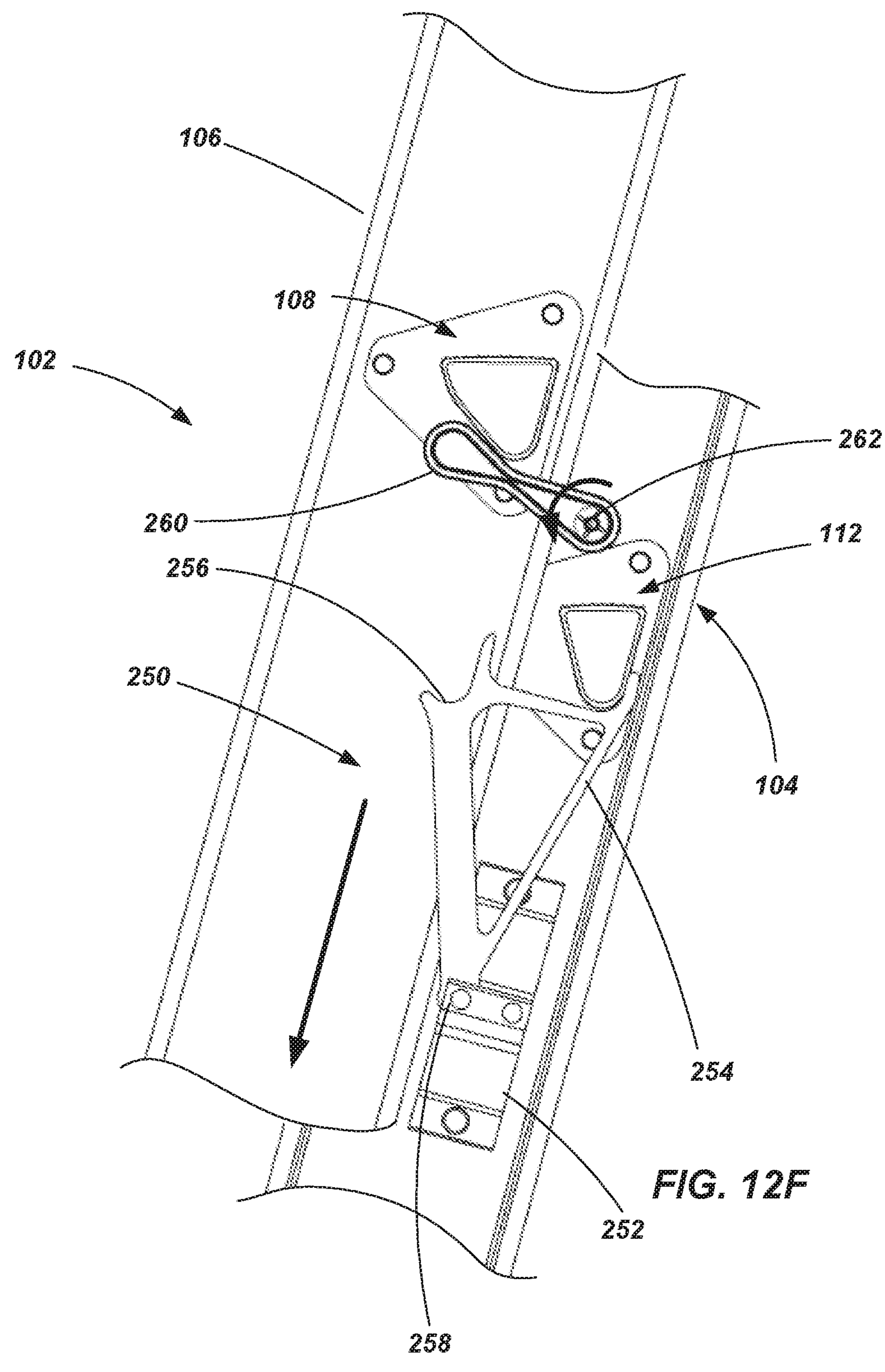
Figure 12G:
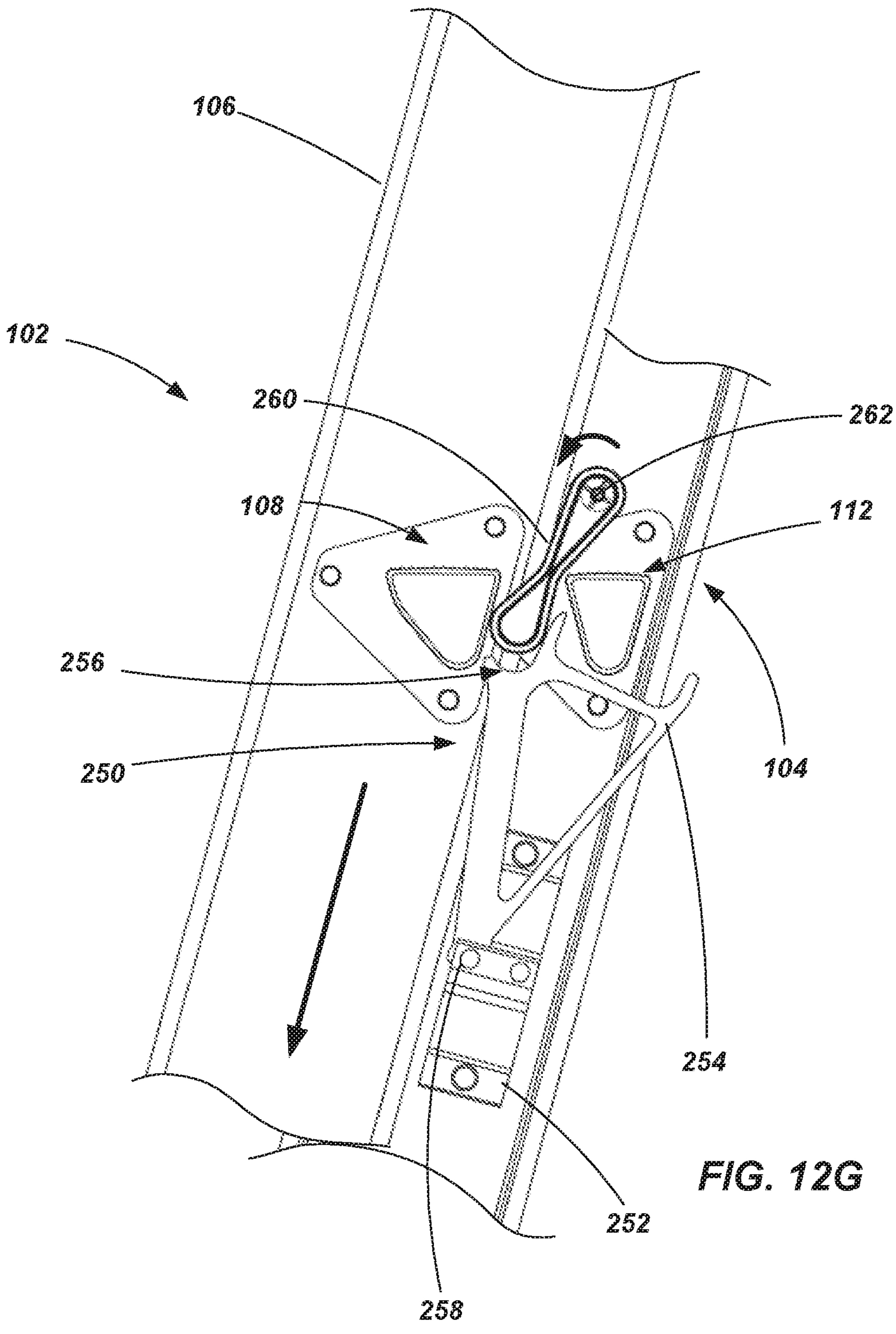

Thus, as the rung 108 travels upwards through the flipper 260, the rung 108 pushes the flipper 260 out of the way (rotating clockwise as shown in FIG. 12D), with the flipper 260 returning to its neutral state once the rung 108 has moved upward beyond the flipper 260 (as shown in FIG. 12E). When moving downwards, the rung 108 may engage the flipper 260 to make it rotate counterclockwise until the radial outermost portion of the flipper 260 substantially occludes the space adjacent to the cup or support surface 256 of the arm. This enables the rung 108 to continue downwards without engaging the cup or support surface 256 as seen in FIG. 12G. Once the rung 108 is positioned below the cup or support surface 256 of the arm 254, the flipper 260 returns to its neutral position and the fly section 102 may be raised again so that the rung 108 may be positioned back into the cup or support surface as indicated by FIGS. 12A-12C.

Referring now to FIGS. 13A, 13B, 14A, 14B and 15, a foot 116 is shown in accordance with an embodiment of the present invention. The foot 116 includes body 340 configured for coupling with a rail 110 of the base section 104. For example, the body 340 may be sized and shaped to slide over an end of the rail 110 and be coupled therewith by screws, rivets, other mechanical fasteners, adhesives, thermal welding or other appropriate means. A traction surface 342 may be coupled with, or formed integrally with, the body 340. The traction surface 342 may include, for example, a polymer material configured to engage the ground or other supporting surface when the ladder is in use.

The foot 116 may additionally include a retractable engagement member 344 pivotally coupled with the body 340. In one embodiment, the engagement member 344 may include a generally U-shaped frame 346 with the ends of the bracket being coupled to the body 340 by way of pivot members 348 (e.g., a rivet, fastener or other body providing a shaft portion) extending through slots 350. Additional slots 352 are formed in opposing walls of the frame 346 and may include a main arcuate portion 354 and a secondary portion 356 extending at an angle (e.g., transversely) from the main portion 354. Thus, these slots 352 may be referred to as L-slots. Rivets 358 (or fasteners or other body providing a shaft) extend through the slots 352 and are coupled with the body 340 to assist in selectively positioning the engagement member relative to the body 340. The engagement members 344 additionally include engagement features 360 (e.g., tines, barbs, a serrated edge, etc.) for engagement with a supporting surface when desired. For example, the engagement features 360 may be used to penetrate an earthen surface. In another example, the engagement features may be used to extend through a gap between two adjacent planks when the ladder is being used on a scaffold type platform.

Figure 13A:
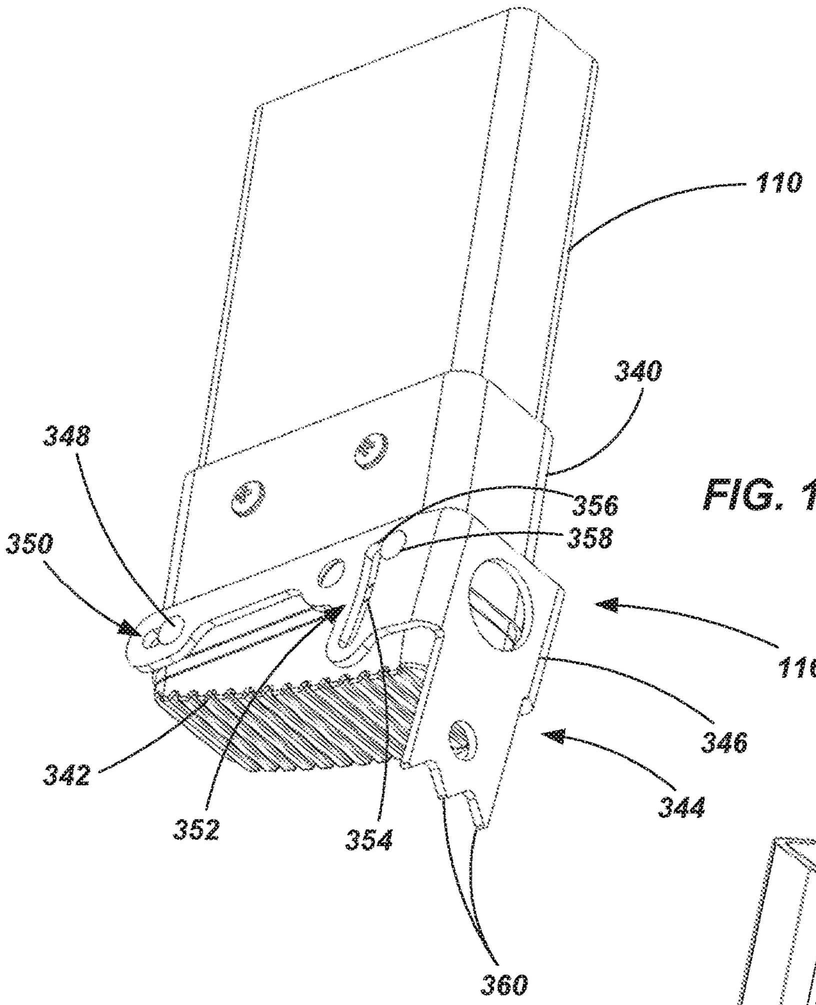
FIGS. 13A and 13B are perspective views of a portion of the ladder shown in FIG. 1 including a foot component in a first state of use.
Figure 13B:
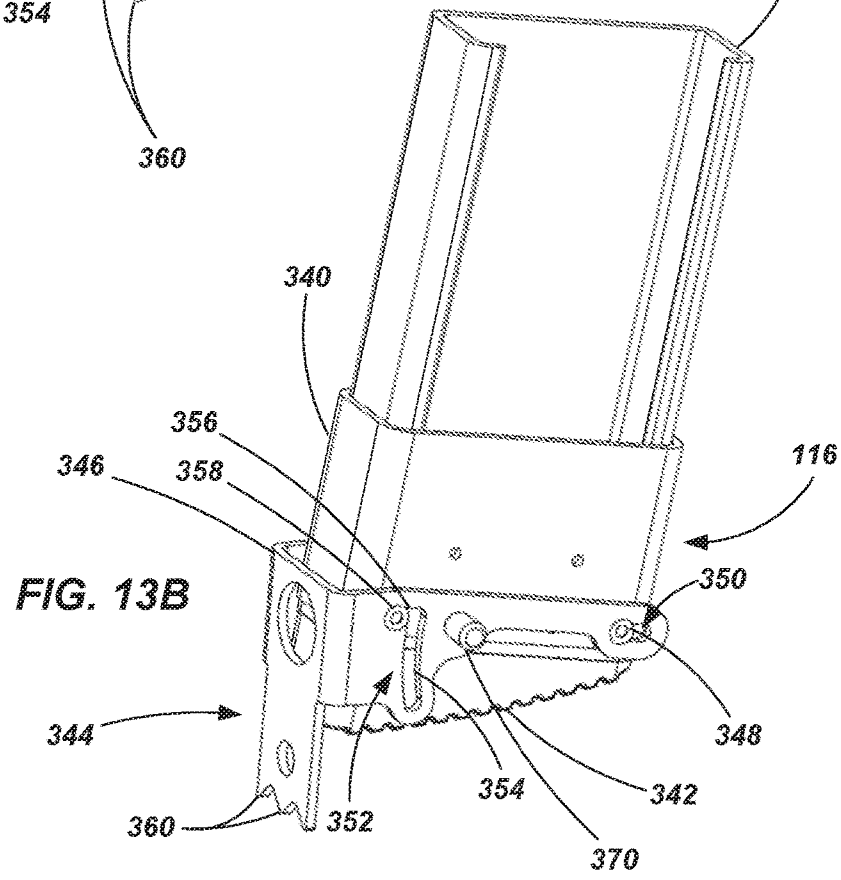
Figure 14A:
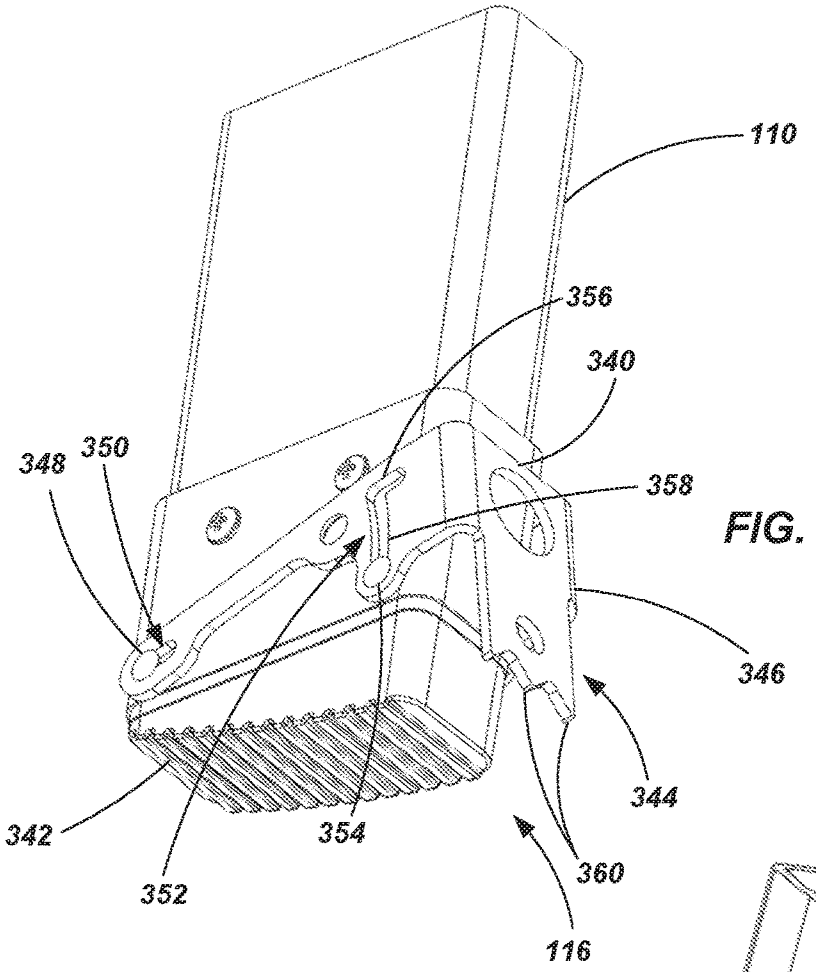
FIGS. 14A and 14B are perspective views of the portion of the ladder shown in FIGS. 13A and 13B with the foot component in a second state of use.
Figure 14B:
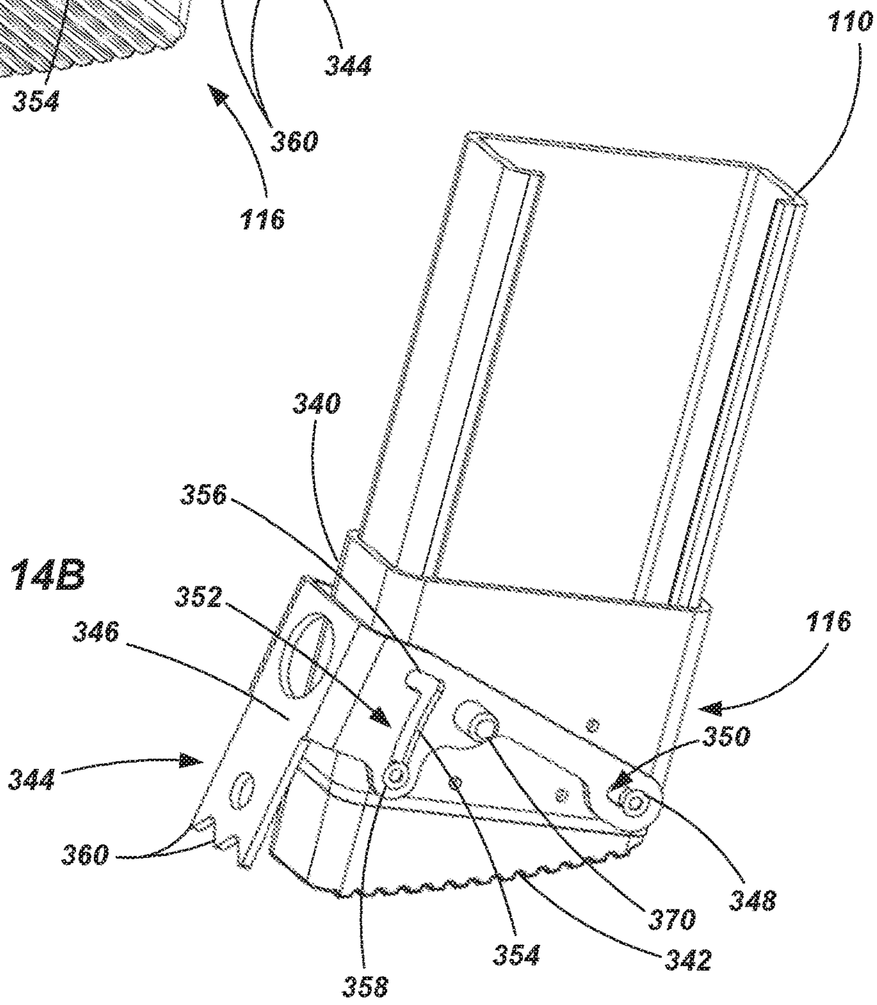
Figure 15:
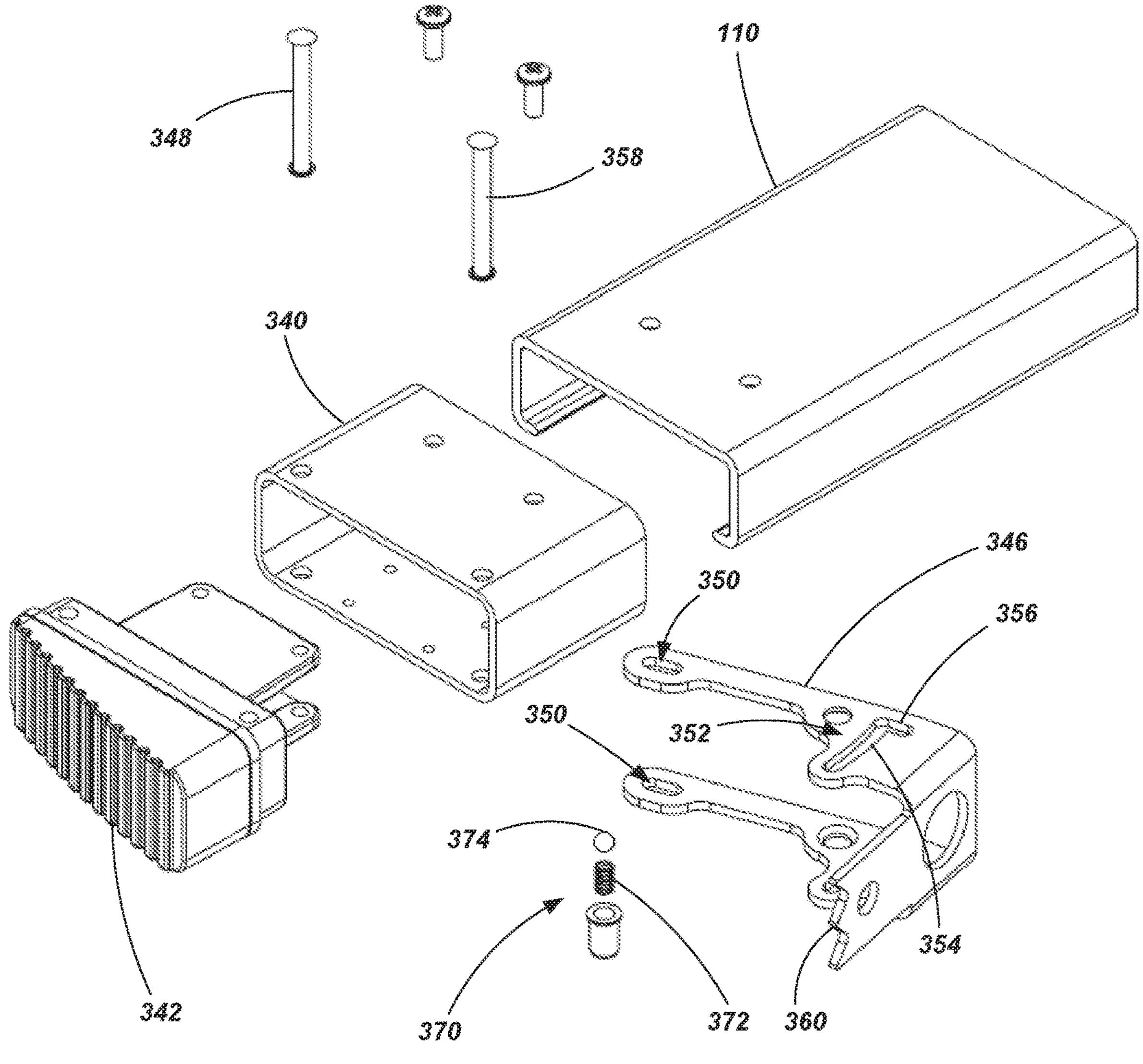
FIG. 15 is an exploded view of a the component shown in FIGS. 13A, 13B, 14A and 14B.

As seen in FIGS. 13A and 13B, the engagement member 344 may be extended such that the engagement features extend below the traction surface 342. In such a state, the rivets 358 may be engaged with the secondary portion 356 of the L-slots 352 to retain the engagement member 344 in the extended position until a user desires to retract the engagement members 344. FIGS. 14A and 14B show the engagement members 344 in a retracted state, with lower portion of the L-slots 352 acting as a stop or a limiter for the engagement members 344. In this position, the engagement features 360 are positioned above the traction surface 342 so that, for example, they will not mar or scratch the surface that is supporting the ladder (e.g., a wooden floor). In one embodiment, a biasing member may be used to bias the engagement member 344 upwards toward the retracted state (FIGS. 14A and 14B). For example, a pivot spring may be coupled between the body 340 and the engagement member 344 at a location adjacent a pivot member 348. In another embodiment, a detent mechanism 370 (e.g., having a ball 372 and spring member 374) may be used to maintain the engagement member 344 in a retracted state until a user applies a sufficient force to overcome the retaining force of the detent mechanism and displace the engagement member to an extended state.

Figure 16A:
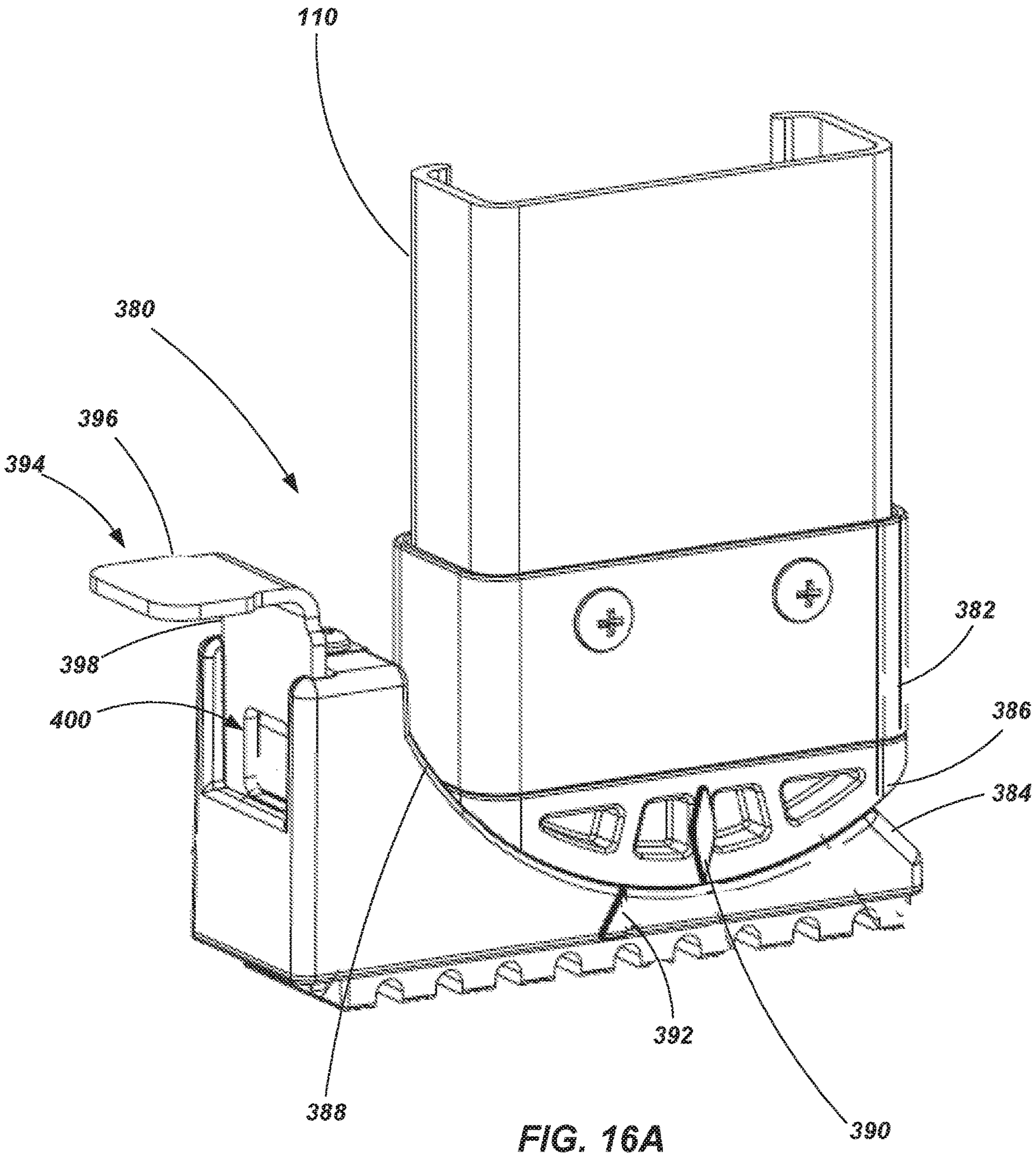
FIGS. 16A and 16B are perspective views of a portion of the ladder shown in FIG. 1 including a foot component in various states of use according to another embodiment of the invention.
Figure 16B:
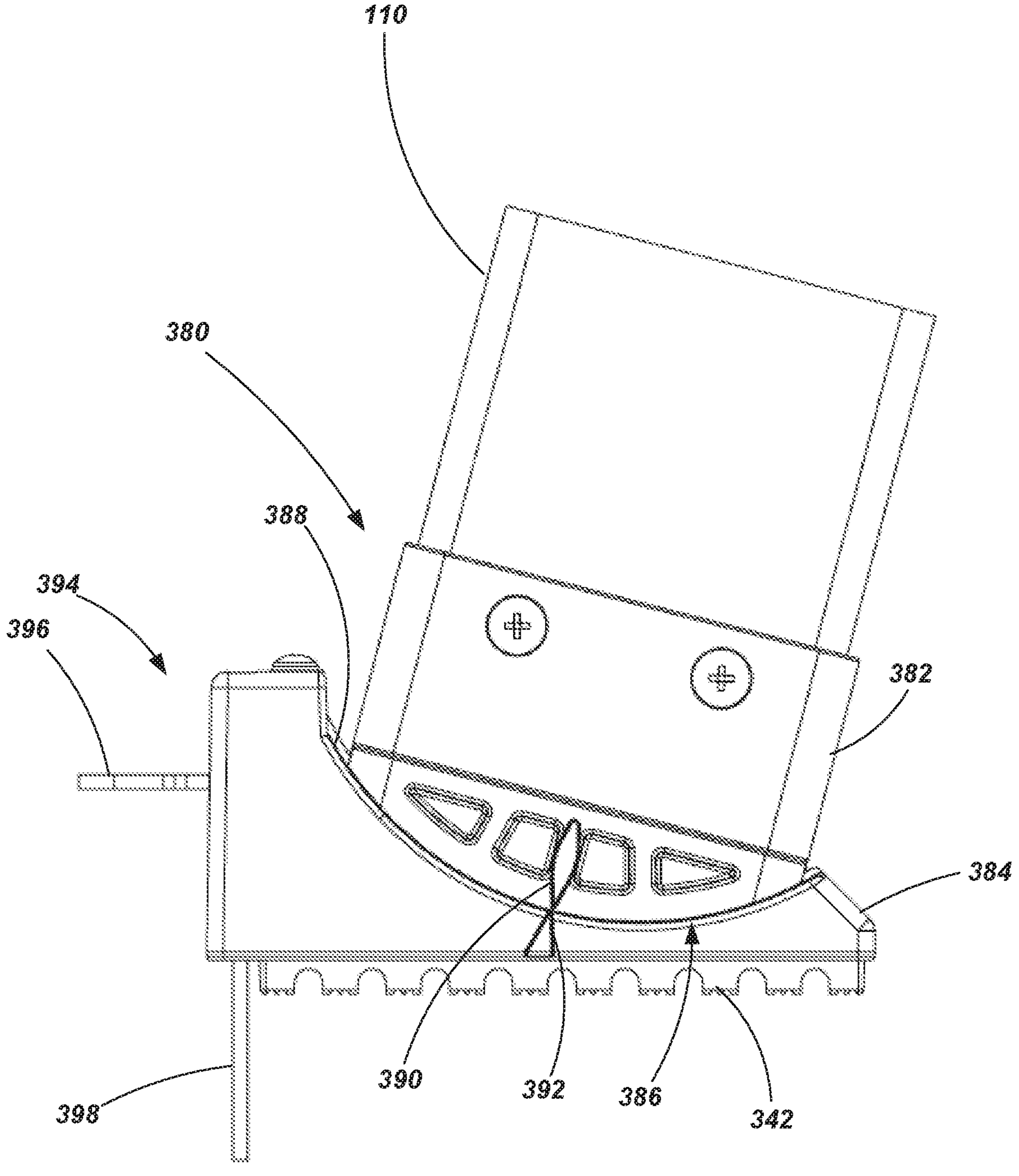

Referring now to FIGS. 16A and 16B, foot 380 is shown in accordance with another embodiment of the present invention. The foot 380 includes a first body portion 382 configured for coupling with a rail 110 of the base section 104 such as described above regarding other embodiments. The foot 380 includes a second body portion 384 which is slidably coupled to the first body portion 382. As with other embodiments described herein, the foot may include a traction surface 342 which, in this embodiment, is associated with the second body portion 384.

The first and second body portions 382 and 384 each include mating curved surfaces 386 and 388, respectively, enabling the first and second body portions to slide, relative to each other, along a curve path. The first and second body portions 382 and 384 may be coupled to each other, for example, using a one or more mating slot/groove arrangements as will be appreciated by those of ordinary skill in the art. Thus, the first body portion 382 and the second body portion 384 may be pivoted, or slidably adjusted, relative to each other from a first position (FIG. 16A) to at least a second position (FIG. 16B). It is noted that markers or indicia 390 and 392 may be associated with the first and second body portions 382 and 384, respectively, to show when the first body portion 382 is in a preferred orientation relative to the second body portion 384 (as indicated by alignment of the indicia 390 and 392 in FIG. 16B). Such a preferred orientation may be associated with a desired angle of the rails of the ladder 100 when the second body portion 384 is properly engaged with a level support surface.

The foot 380 further includes an engagement member 394 that is slidably coupled with the second body portion 384 between a retracted position (FIG. 16A) and an extended position (FIG. 16B). In one embodiment, as shown, the engagement member 394 may include an L-shaped structure having a first leg 396 and a second leg 398. The second leg 398 may include an opening 400 formed therein and configured, for example, to be engaged by a spring-loaded locking member (not shown) disposed within the second body portion 384 to hold it in an extended position. Release of the locking member may be manual (actuated by the user) or may include an automatic release based, for example, on the position of the first body portion 382 relative to the second body portion 384. In one example, when the first and second body portions 382 and 384 are in the relative positions shown in FIG. 16B, the locking member may remain engaged with the opening 400 of the engagement member 394. On the other hand, when the first and second body portions 382 and 384 are in the relative positions shown in FIG. 16A, the locking member may be released, enabling the engagement member to move to the retracted position. In one embodiment, a biasing member may be used to bias the engagement member 394 toward the retracted position. In other embodiments, another locking mechanism, a detent mechanism (such as described above) or some other device may be used to maintain the engagement member 394 in a retracted state until a user desires to displace it into the extended state.

Figure 17:
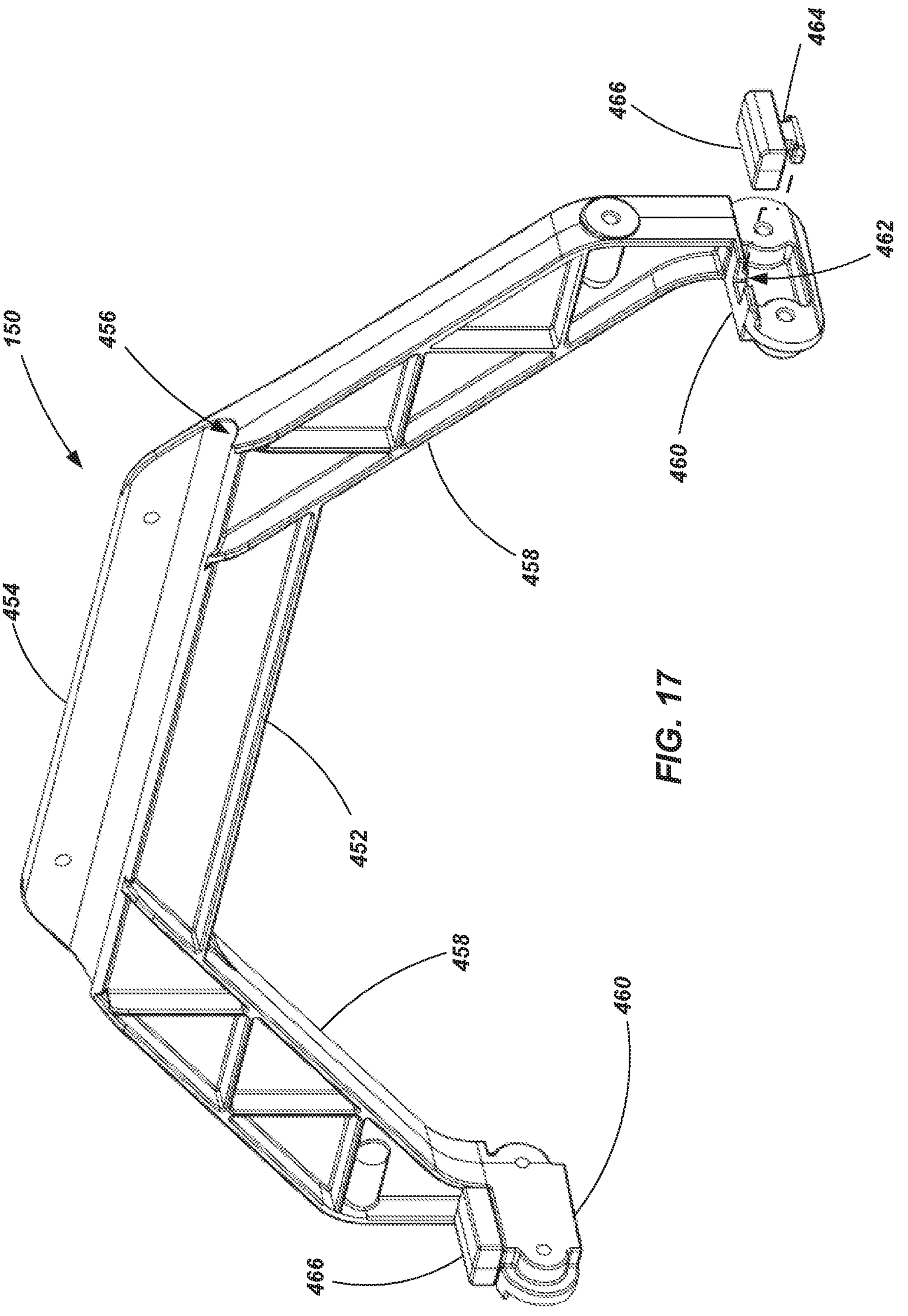
FIG. 17 is a perspective view of a component of a ladder according to an embodiment of the present invention.

Referring now to FIG. 17, a support bracket 150 or brace member is shown in accordance with an embodiment of the present invention. The bracket 150 includes an upper arm 452 having a flange 454 configured for mounting to the lowermost rung 112 of the base section 104 such as by way of rivets, screws or other appropriate fasteners or joining methods. An upper surface 456 of the upper arm may include a mating surface (e.g., a concave surface) for engaging the lower surface or wall of the rung 112. A pair of side arms 458 extend from the upper arm 452 downwardly and out toward the rails 110 of the base section 104. Projecting portions 460 extend generally transversely from the terminal ends of the side arms 458. The bracket 150 may be attached to the side rails 110 of the base section at the terminal ends of the side arms 458, the projecting portions 460, or both by way of rivets, screws, other mechanical fasteners or other joining methods. In one embodiment, a slot 462 or key may be formed in each of the projecting portions 460 (shown only in one projecting portion 460 for sake of convenience and clarity). The slots 462 may be configured to matingly receive a tab 464 of a stop member 466. The stop member 466 may be formed, for example, of a medium durometer elastomeric material (e.g., a rubber or other polymer material). The stop member 466 provides an abutment for an end of the rails 106 of the fly section 102—or some related component such as a bearing member 118 located in the lower portion of the rails 106. If the fly section 102 is dropped too quickly, the bump stop helps to absorb the energy of the falling section through elastic deformation. The stop members 466 are configured to be removable and replaceable. Additionally, the entire support bracket is configured for easy removal and replacement should fatigue or any other reason require such.

While the invention may be susceptible to various modifications and alternative forms, specific embodiments have been shown by way of example in the drawings and have been described in detail herein. However, it should be understood that the invention is not intended to be limited to the particular forms disclosed. Indeed, features or elements of any disclosed embodiment may be combined with features or elements of any other disclosed embodiment without limitation. The invention includes all modifications, equivalents, and alternatives falling within the spirit and scope of the invention as defined by the following appended claims.

What is claimed is:

1. A ladder, comprising:

a base section comprising a first pair of spaced apart rails and a first plurality of rungs extending between and coupled to the first pair of spaced apart rails;

a fly section comprising a second pair of spaced apart rails and a second plurality of rungs extending between and coupled to the second pair of spaced apart rails, the fly section being slidably coupled to the base section:

a brace coupled to a lowermost rung of the first plurality of rungs and coupled with the first pair of spaced apart rails, the brace including:

an upper arm, a first side arm extending down from the upper arm and toward a first rail of the first pair of spaced apart rails, a second side arm extending down from the upper arm and toward a second rail of the first pair of spaced apart rails, a first stop member located adjacent a distal end of the first side arm and configured to abut a lower end of a first rail of the second pair of spaced apart rails, and a second stop member located adjacent a distal end of the second side arm and configured to abut a lower end of a second rail of the second pair of spaced apart rails, wherein the first stop member and the second stop member are configured to elastically deform to absorb energy responsive to a relative motion between the fly section and the base section.

2. The ladder of claim 1, wherein the fly section is arranged such that a rear surface of the second pair of spaced apart rails extends in a plane located between the first plurality of rungs and the second plurality of rungs.

3. The ladder of claim 2, wherein the first plurality of rungs are offset from a longitudinal centerline of the first pair of spaced apart rails towardasil a rear surface of the first pair of spaced apart rails.

4. The ladder of claim 3, wherein the second plurality of rungs are offset towardasil the rear surface of the second pair of spaced apart rails relative to a longitudinal centerline of the second pair of spaced apart rails.

5. The ladder of claim 1, wherein each the second plurality of rungs exhibit a larger upper surface area than do the first plurality of rungs.

6. The ladder of claim 1, further comprising at least one bearing component coupled with an end of one of the first pair of spaced apart rails and at least one other bearing component coupled with an end of one of the second pair of spaced apart rails.

7. The ladder of claim 1, wherein a rear surface of the second pair of spaced apart rails is positioned along a line that is approximately half way between a front surface of the first pair of spaced apart rails and a rear surface of the first pair of spaced apart rails.

8. The ladder of claim 1, further comprising a pair of feet, each foot being coupled with a lower end of a rail of the first pair of spaced apart rails.

9. The ladder of claim 8, wherein each foot includes at least one body portion, a traction surface, and an engagement member selectively positionable relative to the at least one body portion.

10. The ladder of claim 9, wherein the at least one body portion includes a first body portion and a second body portion, the first body portion being slidably coupled to the second body portion along a curved surface.

11. The ladder of claim 1, wherein an overall depth of the ladder, measured from the rear surface of the first pair of spaced apart rails to a front surface of the second pair of spaced apart rails, is approximately 1.65 times, or less, of a distance from a front surface of the first pair of spaced apart rails to the rear surface of the first pair of spaced apart rails.

12. The ladder of claim 1, wherein the first stop member is positioned on a first projecting portion extending from the distal end of the first side arm and wherein the second stop member is positioned on a second projecting portion extending from the distal end of the second side arm.

13. The ladder of claim 12, wherein the first stop member and the second stop member comprise an elastomeric material.

14. The ladder of claim 1, wherein the upper arm of the brace includes a concave surface matingly engaging a lower surface of the lowermost rung.

15. The ladder of claim 14, wherein the brace further comprises a flange extending from the upper arm, wherein the flange is secured to the lowermost rung.

16. A ladder comprising:

a base section comprising a first pair of spaced apart rails and a first plurality of rungs extending between and coupled to the first pair of spaced apart rails;

a fly section comprising a second pair of spaced apart rails and a second plurality of rungs extending between and coupled to the second pair of spaced apart rails, the fly section being slidably coupled to the base section:

a brace coupled to a lowermost rung of the first plurality of rungs and coupled with the first pair of spaced apart rails, the brace including:

an upper arm, a first side arm extending down from the upper arm and toward a first rail of the first pair of spaced apart rails, a second side arm extending down from the upper arm and toward a second rail of the first pair of spaced apart rails, a first stop member located adjacent a distal end of the first side arm and configured to abut a longitudinally-facing surface of a lower end of a first rail of the second pair of spaced apart rails, and a second stop member located adjacent a distal end of the second side arm and configured to abut a longitudinally-facing surface of a lower end of a second rail of the second pair of spaced apart rails, wherein the first stop member and the second stop member comprise an elastomeric material.

17. The ladder of claim 16, wherein the fly section is arranged such that a rear surface of the second pair of spaced apart rails extends in a plane located between the first plurality of rungs and the second plurality of rungs.

18. The ladder of claim 16, wherein a rear surface of the second pair of spaced apart rails is positioned along a line that is approximately half way between a front surface of the first pair of spaced apart rails and a rear surface of the first pair of spaced apart rails.

19. The ladder of claim 16, wherein the first stop member is positioned on a first projecting portion extending from the distal end of the first side arm and wherein the second stop member is positioned on a second projecting portion extending from the distal end of the second side arm.

20. A ladder comprising:

a base section comprising a first pair of spaced apart rails and a first plurality of rungs extending between and coupled to the first pair of spaced apart rails;

a fly section comprising a second pair of spaced apart rails and a second plurality of rungs extending between and coupled to the second pair of spaced apart rails, the fly section being slidably coupled to the base section:

a brace coupled to a lowermost rung of the first plurality of rungs and coupled with the first pair of spaced apart rails, the brace including:

an upper arm, a first side arm extending down from the upper arm and toward a first rail of the first pair of spaced apart rails, a second side arm extending down from the upper arm and toward a second rail of the first pair of spaced apart rails, a first stop member located adjacent a distal end of the first side arm and configured to abut a lower end of a first rail of the second pair of spaced apart rails, and a second stop member located adjacent a distal end of the second side arm and configured to abut a lower end of a second rail of the second pair of spaced apart rails;

wherein the first stop member and the second stop member comprise an elastomeric material.

* * * * *